United States Patent
Seals et al.

(10) Patent No.: US 9,617,814 B2
(45) Date of Patent: Apr. 11, 2017

(54) AUTOMATED CONTROLS FOR PUMP DOWN OPERATIONS

(75) Inventors: Eddie Seals, College Station, TX (US); Neil Joseph Modeland, Gladewater, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 783 days.

(21) Appl. No.: 13/814,296

(22) PCT Filed: Aug. 10, 2010

(86) PCT No.: PCT/US2010/044999
§ 371 (c)(1),
(2), (4) Date: Feb. 5, 2013

(87) PCT Pub. No.: WO2012/021126
PCT Pub. Date: Feb. 16, 2012

(65) Prior Publication Data
US 2013/0138254 A1    May 30, 2013

(51) Int. Cl.
*E21B 23/08* (2006.01)
*G05B 19/43* (2006.01)
*E21B 43/116* (2006.01)
*E21B 44/02* (2006.01)
*E21B 7/06* (2006.01)
*E21B 43/263* (2006.01)
(Continued)

(52) U.S. Cl.
CPC ............. *E21B 23/08* (2013.01); *E21B 7/068* (2013.01); *E21B 23/14* (2013.01); *E21B 43/116* (2013.01); *E21B 43/263* (2013.01); *E21B 44/02* (2013.01); *G05B 19/43* (2013.01); *E21B 43/128* (2013.01); *E21B 44/00* (2013.01); *E21B 47/0007* (2013.01); *E21B 47/01* (2013.01); *E21B 47/12* (2013.01); *E21B 47/124* (2013.01)

(58) Field of Classification Search
CPC ........ E21B 23/08; E21B 44/02; E21B 43/116; E21B 43/263; E21B 44/00; G05B 19/43
See application file for complete search history.

(56) References Cited

U.S. PATENT DOCUMENTS 3,957,115 A    5/1976   Kerzee et al.
4,637,468 A    1/1987   Derrick
(Continued)

FOREIGN PATENT DOCUMENTS

GB    2505362    2/2014

OTHER PUBLICATIONS

International Search Report and Written Opinion, Application No. PCT/US2011/051375 dated Apr. 24, 2012.
(Continued)

*Primary Examiner* — Ramesh Patel
(74) *Attorney, Agent, or Firm* — Chamberlain Hrdlicka

(57) ABSTRACT

In at least some embodiments, a system for pump down operations includes a wireline unit and a pump unit. The system also includes a controller coupled to the wireline unit and the pump unit. The controller is to automate at least one control function selected from the group consisting of: a pump rate for the pump unit based on at least one of a monitored wireline speed and a monitored wireline tension for the wireline unit; and a wireline speed for the wireline unit based on at least a monitored pump rate for the pump unit.

28 Claims, 20 Drawing Sheets

(51) Int. Cl.
*E21B 23/14* (2006.01)
*E21B 44/00* (2006.01)
*E21B 47/00* (2012.01)
*E21B 47/12* (2012.01)
*E21B 47/01* (2012.01)
*E21B 43/12* (2006.01)

(56) References Cited

U.S. PATENT DOCUMENTS

| | | | | |
|---|---|---|---|---|
| 5,325,923 A * | 7/1994 | Surjaatmadja | ........... | E21B 17/08 166/308.1 |
| 5,343,963 A * | 9/1994 | Bouldin | ................... | E21B 23/00 166/65.1 |
| 6,048,175 A * | 4/2000 | Corlew | ................. | E21B 43/121 417/120 |
| 6,138,764 A * | 10/2000 | Scarsdale | ................ | E21B 23/08 116/117.6 |
| 6,368,068 B1 * | 4/2002 | Corlew | ................. | E21B 43/121 417/120 |
| 7,165,619 B2 * | 1/2007 | Fox | ......................... | E21B 7/124 166/343 |
| 9,013,322 B2 * | 4/2015 | Roberson | ................ | E21B 47/00 166/250.1 |
| 2003/0178200 A1 * | 9/2003 | Fox | ......................... | E21B 7/124 166/341 |
| 2007/0137860 A1 * | 6/2007 | Lovell | ..................... | E21B 43/25 166/250.01 |
| 2007/0181304 A1 * | 8/2007 | Rankin | .................. | E21B 23/08 166/297 |
| 2008/0047705 A1 * | 2/2008 | Vaello | .................. | E21B 43/126 166/250.15 |
| 2009/0055029 A1 * | 2/2009 | Roberson | ................ | E21B 47/00 700/282 |
| 2009/0260823 A1 * | 10/2009 | Prince-Wright | ....... | C10G 21/22 166/302 |
| 2009/0301723 A1 | 12/2009 | Gray | | |
| 2010/0319910 A1 * | 12/2010 | Ives | ...................... | B66D 1/58 166/250.01 |
| 2014/0309796 A1 * | 10/2014 | Mueller | ................. | F04B 17/04 700/282 |

OTHER PUBLICATIONS

International Search Report issued Apr. 27, 2011 in International Application No. PCT/US2010/044999.

* cited by examiner

AUTOMATED CONTROLS FOR PUMP DOWN OPERATIONS

BACKGROUND

After a wellbore is drilled into a subterranean formation, a liner or casing may be coupled to the borehole wall to maintain or strengthen the wall. The drilling apparatus is removed and the liner or casing is placed into the wellbore. An annular area is thus formed between the casing string and the formation. A cementing operation is then conducted in order to fill the annular area with cement. Downhole application of the cement may include the use of plugs or darts to separate the cement from a displacement fluid, to wipe the inside of the casing or liner, and to provide a hydraulic pressure indication that the cement conveyed through the casing or liner has been fully inserted into the annular area between the casing and the formation. The wellbore is buttressed by the cemented casing.

To properly produce hydrocarbons from the formation into the wellbore, the well may be stimulated by perforating or fracturing operations. Stimulating the well in such ways increases hydrocarbon production from the well, as the perforations or fractures propagated into the formation provide conductivity paths for the formation fluids along which the greatest possible quantity of hydrocarbons in an oil and gas reservoir can be drained/produced into the well bore. In some wells, it may be desirable to individually and selectively create multiple fractures along a well bore at a distance apart from each other. To control the creation of multi-zone fractures along the well bore, it may be necessary to cement a casing or liner to the well bore and mechanically isolate the subterranean formation being fractured from previously-fractured formations, or formations that have not yet been fractured. To perforate the casing and fracture the formation, a device may be lowered into the cased wellbore with explosives or charges. Once lowered to the proper depth, the device, such as a perforating gun, is actuated to perforate the casing and fracture the formation. The pumping operations and perforating operations described are often referred to as "pump-and-perf" operations. Efforts to improve efficiency of pump-and-perf operations or other pump down operations are continually being sought.

BRIEF DESCRIPTION OF THE DRAWINGS

For a detailed description of exemplary embodiments, reference will now be made to the accompanying drawings in which.

DETAILED DESCRIPTION

Figure 1:
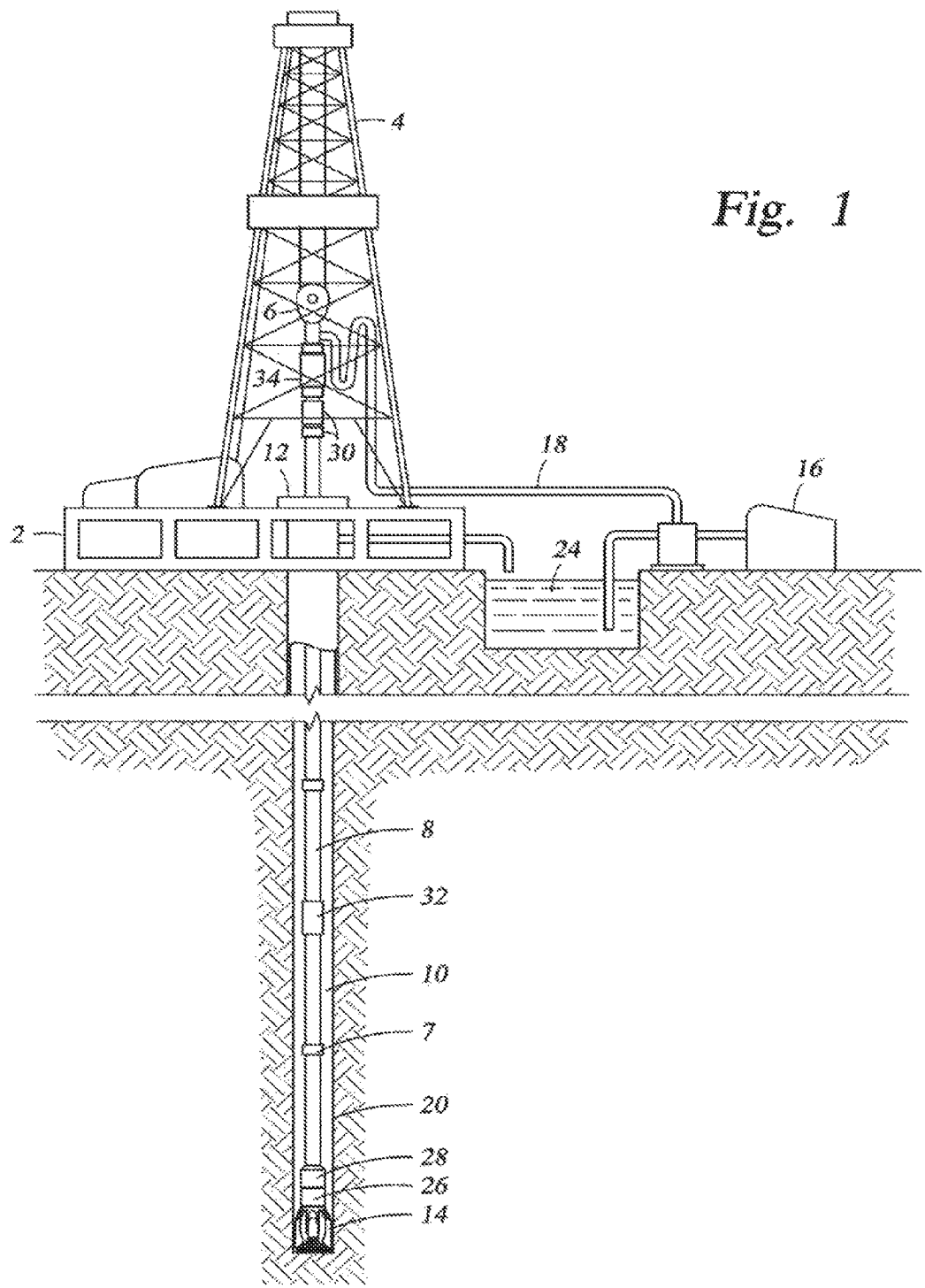
FIG. 1 shows an illustrative logging while drilling (LWD) environment.

In the drawings and description that follow, like parts are typically marked throughout the specification and drawings with the same reference numerals. The drawing figures are not necessarily to scale. Certain features of the disclosure may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the invention, and is not intended to limit the disclosure to that illustrated and described herein. It is to be fully recognized that the different teachings of the embodiments discussed below may be employed separately or in any suitable combination to produce desired results.

In the following discussion and in the claims, the terms "including" and "comprising" are used in an inclusive fashion, and thus should be interpreted to mean "including, but not limited to . . . ". Unless otherwise specified, any use of any form of the terms "connect", "engage", "couple", "attach", or any other term describing an interaction between elements is not meant to limit the interaction to direct interaction between the elements and may also include indirect interaction between the elements described. Reference to up or down will be made for purposes of description with "up", "upper", "upwardly" or "upstream" meaning toward the surface of the well and with "down", "lower", "downwardly" or "downstream" meaning toward the terminal end of the well, regardless of the wellbore orientation. In addition, in the discussion and claims that follow, it may be sometimes stated that certain components or elements are in fluid communication. By this it is meant that the components are constructed and interrelated such that a fluid could be communicated between them, as via a passageway, tube, or conduit. The various characteristics mentioned above, as well as other features and characteristics described in more detail below, will be readily apparent to those skilled in the art upon reading the following detailed description of the embodiments, and by referring to the accompanying drawings.

Disclosed herein are systems and methods for automated monitoring and control of pump down operations. More specifically, the pump rate of a pump unit (or units), the line speed for a logging/perforating (L/P) unit, and the line tension for the L/P unit may be automatically monitored and controlled to enable efficient pump down operations. In at least some embodiments, pump down operations may be based on a predetermined line speed, a predetermined line tension and/or a predetermined pump rate. However, if any of these parameters change during pump down operations, the other parameters will be adjusted automatically. The techniques disclosed herein improve safety of pump down operations by eliminating the possibility of pumping the tools off the end of the wireline cable or other catastrophes.

As a specific example, if the monitored line tension surpasses a desired threshold, the line speed will be automatically reduced to maintain the desired line tension and the pump rate will be reduced in accordance with the amount of change in the line speed. Thereafter, if the monitored line tension drops below the predetermined threshold, the line speed will be automatically increased (up to a desired line speed) and the pump rate will be increased in accordance with the line speed. Similarly, changes in the monitored pump rate during pump down operations may result in automated changes to the line tension and/or line speed of the L/P unit.

The disclosed operations are best understood in the context of the larger systems in which they operate. Accordingly, an illustrative logging while drilling (LWD) environment is shown in FIG. 1. A drilling platform 2 is equipped with a derrick 4 that supports a hoist 6 for raising and lowering a drill string 8. The hoist 6 suspends a top drive 34 that is used to rotate the drill string 8 and to lower the drill string 8 through the well head 12. Sections of the drill string 8 are joined by collars 7, typically in the form of threaded connectors. Connected to the lower end of the drill string 8 is a drill bit 14. Drilling is accomplished by rotating the bit 14, by use of a downhole motor near the drill bit 14, and/or by rotating the drill string 8. Drilling fluid, termed "mud", is pumped by mud recirculation equipment 16 through supply pipe 18, through top drive 34, and down through the drill string 8 at high pressures and volumes to emerge through nozzles or jets in the drill bit 14. The mud then travels back up the hole via the annulus formed between the exterior of the drill string 8 and the wellbore wall 20, through a blowout preventer (not specifically shown), and into a mud pit 24 on the surface. On the surface, the drilling mud is cleaned and then recirculated by recirculation equipment 16. The drilling mud is used to cool the drill bit 14, to carry cuttings from the base of the bore to the surface, and to balance the hydrostatic pressure in the rock formations.

The drill string 8 may be any various conveyances, such as a cable, wireline, E-line, Z-line, jointed pipe, coiled tubing, or casing or liner string, for example. A motor driven winch and other associated equipment is supported at the rig floor for extending the work string into the wellbore 10. While exemplary operating environments include a stationary drilling rig for lowering work strings and tools within a land-based wellbore, one of ordinary skill in the art will readily appreciate that mobile workover rigs, well servicing units, such as coiled tubing units, and the like, could also be used. It should be understood that other operational environments are contemplated, such as offshore wells. Although the wellbore 10 of FIG. 1 is shown to have a vertical extension, other wellbores may have a horizontal extension as well.

In at least some embodiments, the drill string 8 comprises logging components to collect information regarding the environment of the wellbore 10. In wells employing acoustic telemetry for LWD, downhole sensors are coupled to an acoustic telemetry transmitter 28 that transmits telemetry signals in the form of acoustic vibrations in the tubing wall of drill string 8. An acoustic telemetry receiver array 30 may be coupled to tubing below the top drive 34 to receive transmitted telemetry signals. One or more repeater modules 32 may be optionally provided along the drill string to receive and retransmit the telemetry signals. The repeater modules 32 include both an acoustic telemetry receiver array and an acoustic telemetry transmitter configured similarly to receiver array 30 and the transmitter 28.

A logging tool 26 may be integrated into the bottom-hole assembly near the bit 14. As the bit 14 extends the wellbore 10 through the formations, the downhole sensors collect measurements relating to various formation properties as well as the tool orientation and position and various other drilling conditions. The orientation measurements may be performed using an azimuthal orientation indicator, which may include magnetometers, inclinometers, and/or accelerometers, though other sensor types such as gyroscopes may be used. In some embodiments, the tool includes a 3-axis fluxgate magnetometer and a 3-axis accelerometer. In some embodiments, logging tool 26 may take the form of a drill collar, i.e., a thick-walled tubular that provides weight and rigidity to aid the drilling process.

Figure 2:
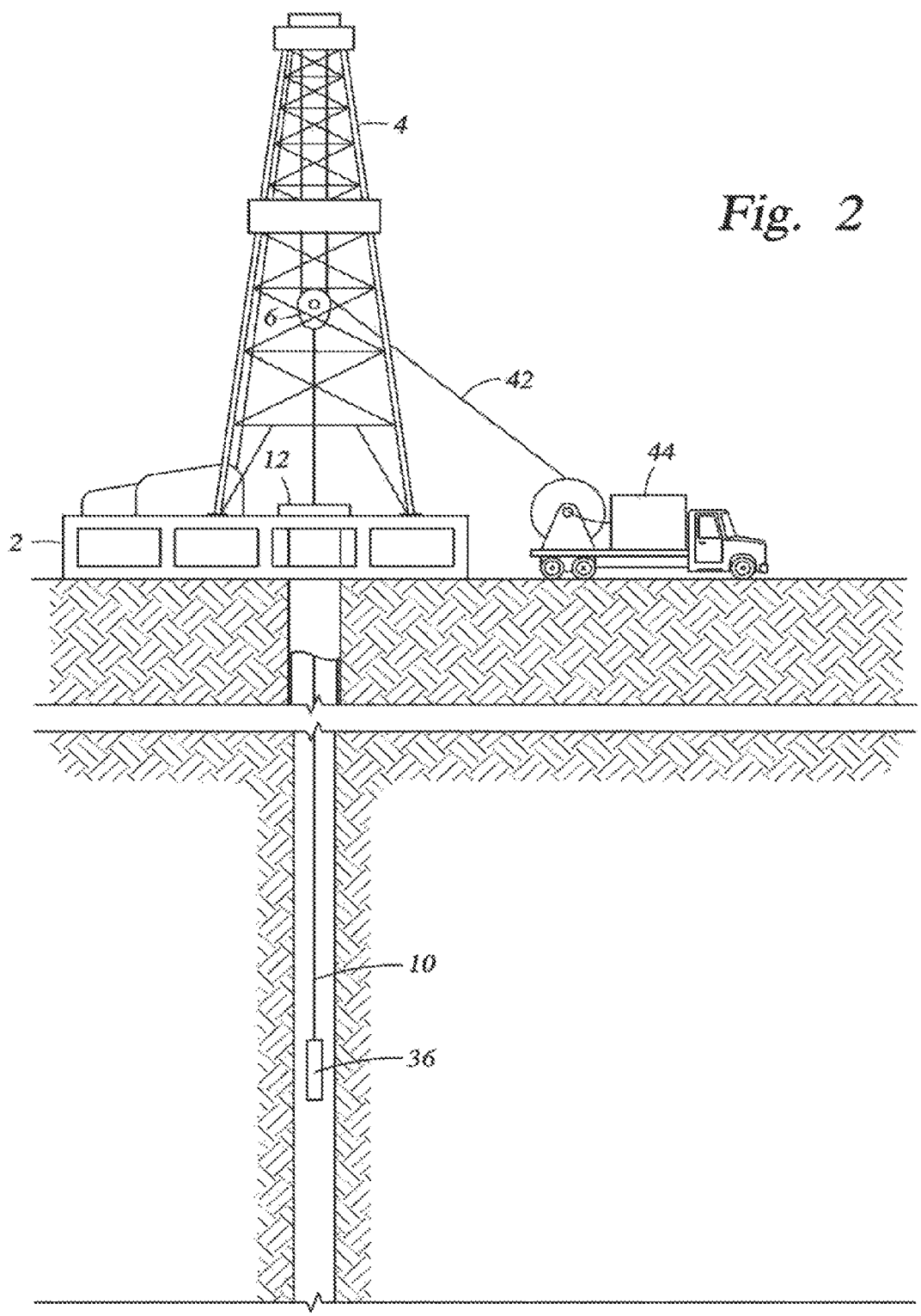
FIG. 2 shows an illustrative wireline tool environment.

At various times during the drilling process, the drill string 8 may be removed from the wellbore 10 as shown in FIG. 2. Once the drill string has been removed, downhole tool(s) 36 may be inserted into the wellbore 10 using a wireline cable 42. For example, the downhole tool(s) 36 may be for logging and/or for pump down operations such as pump-and-perf. The wireline cable 42 may include conductors for transporting power to the tool 36. Conductors of the wireline cable 42 also may enable communications between the tool 36 and a surface control facility 44. In alternative embodiments, wireless communications are implemented between the tool 36 and the surface control facility 44. The surface control facility 44 operates the tool 36 and/or gathers log data or other sensor data from the tool 36.

Figure 3:
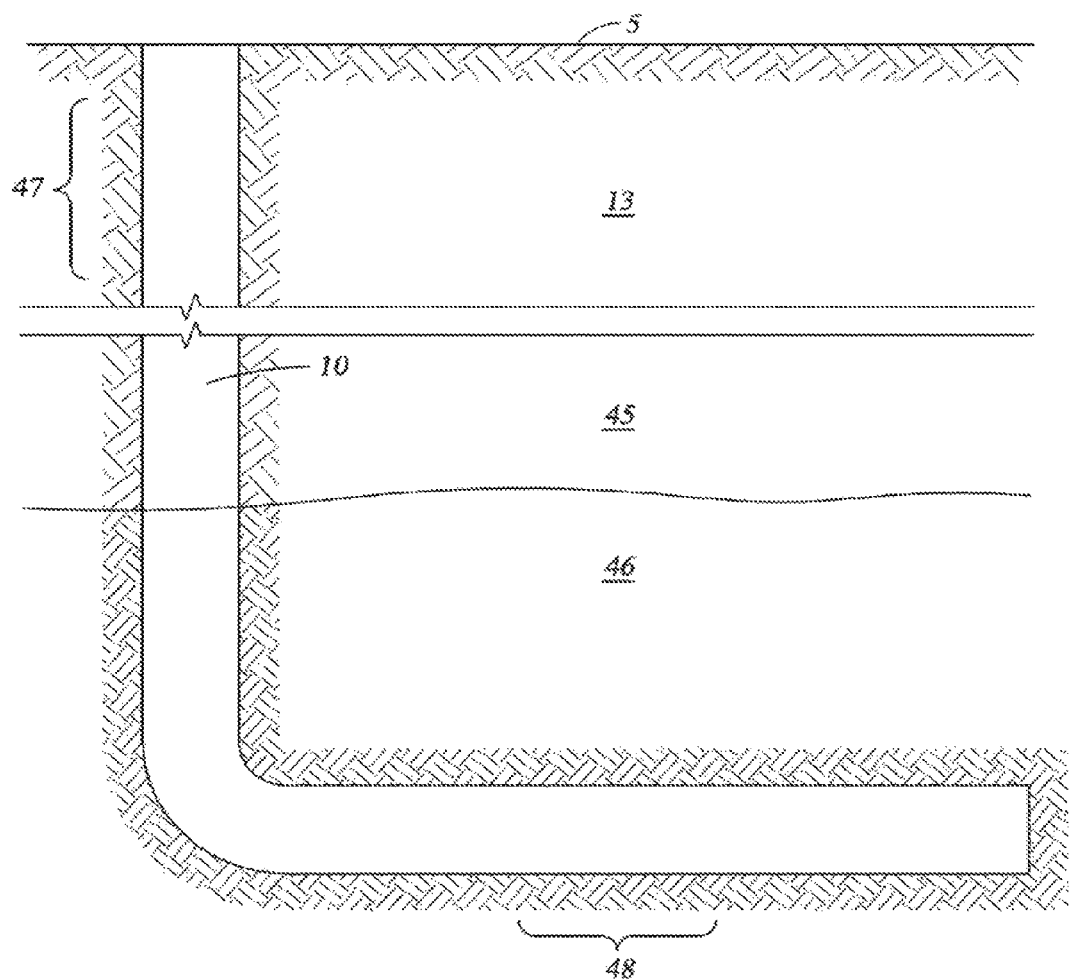
FIG. 3 shows a cross-section view of a drilled wellbore in a hydrocarbon formation.

Referring to FIG. 3, a wellbore 10 has been drilled from the surface 5 into a formation 13 by conventional drilling apparatus (shown in FIG. 1). The formation 13 may include multiple layers 45, 46. As shown, the wellbore 10 may include a vertical portion 47, and in some cases a deviated or horizontal portion 48.

Figures 4, 5:
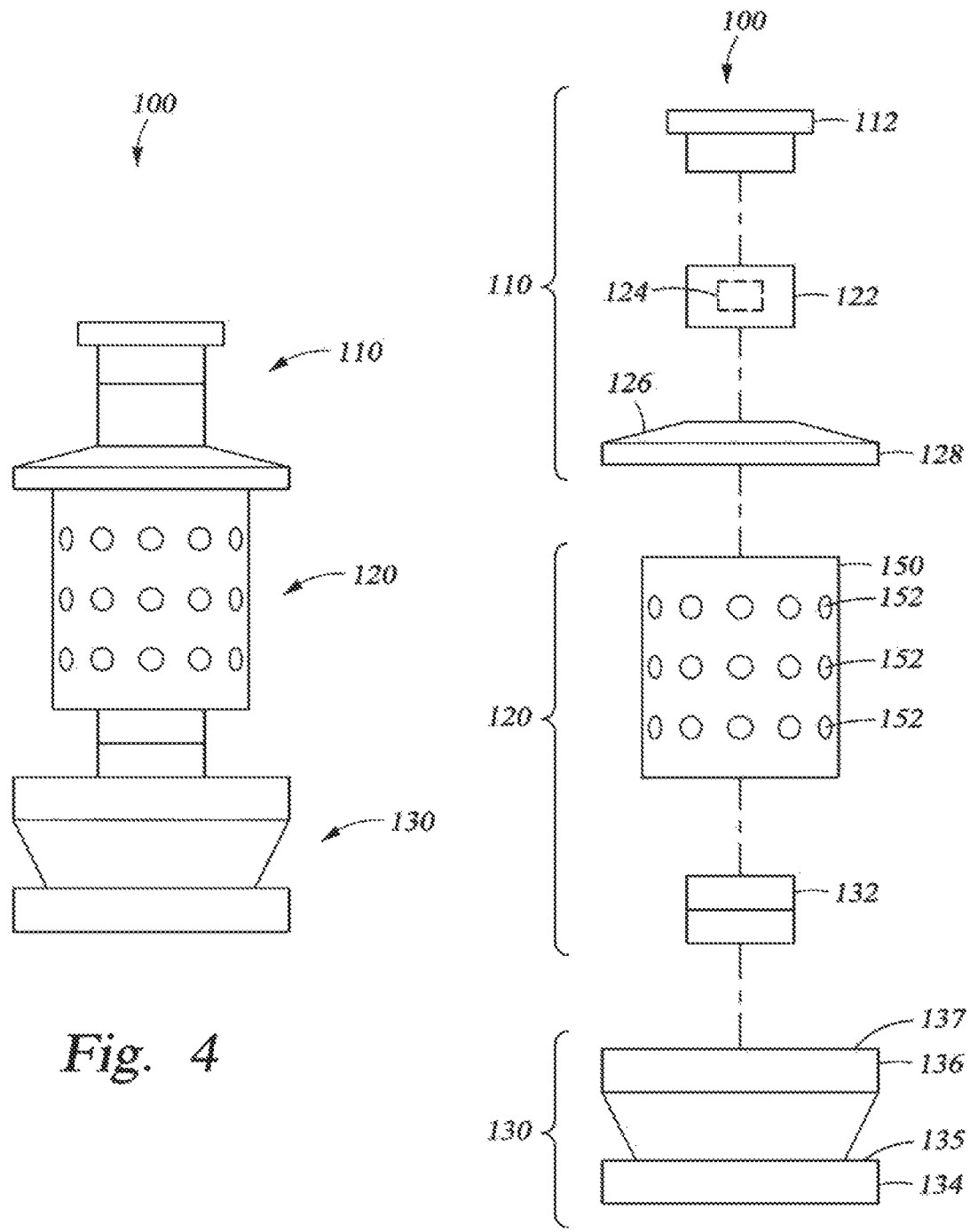
FIG. 4 shows a side view, in partial cross-section, of an embodiment of plug deployed perforating tool.
FIG. 5 shows an exploded view of the plug deployed perforating tool of FIG. 4.

FIGS. 4-17 show various tools and operations related to pump down scenarios that may benefit from the automated control techniques disclosed. However, the automated control techniques disclosed herein are not limited to any particular tool or scenario. In FIG. 4, a tool 100 (e.g., a version of tool 36 in FIG. 2) is shown. The tool 100 may be variously referred to herein as a perforating tool, a plug deployed perforating tool assembly, a pump down plug deployed perforating gun, a cement wiper plug and perforation combination tool, or variations thereof. The pump down plug deployed perforating tool 100 includes an upper retrieval portion 110, an intermediate portion 120 with a perforating or explosive device, and a lower plug portion 130. Other tools, besides tool 100, could alternatively be pumped down. The disclosed control technique is applicable to any operation where hydraulic horsepower (HHP) is used in conjunction with a wireline string. HHP is effective for horizontal wells, where the HHP is needed to push the tool string down the hole. This operation may be accomplished with gauge rings, plugs, perforation guns, plug-and-perf runs and/or various other logging tools. For some wells, pump down operations may be utilized instead of tractor or e-coil operations.

In FIG. 5, an exploded view of the plug deployed perforating tool assembly 100 is shown, separating the coupled portions of the assembly of FIG. 4 for viewing clarity. The upper retrieval portion 110 includes a fishing neck 112. The intermediate portion 120 includes a firing head 122 to which the fishing neck 112 is coupled. The firing head 122 includes internal control components 124. In some embodiments, the internal control components 124 include electronics and circuitry having a timing delay. In some embodiments, the internal control components 124 include sensors for receiving a signal from the surface of the well. Coupled below the firing head 122 is a centralizer 126 including radially extending centralizing members 128. Coupled below the centralizer 126 is a perforating or explosive device 150 including perforators 152. In some embodiments, the perforators 152 include removable charge carriers. In some embodiments, there are one or more perforators 152. The gun 150 includes internal communication elements for communicating with the control electronics 124 of the firing head 122, as well as actuation components for directing the perforators 152. Below the perforating gun 150 is the lower plug portion 130 including a releasable connection 132 coupling the perforating gun 150 to a plug 134. The plug 134 includes a latch down receiver 135, a wiper portion 136 with wiper elements, and a fluid pressure resistance member 137, such as a swab cup.

Figure 6:
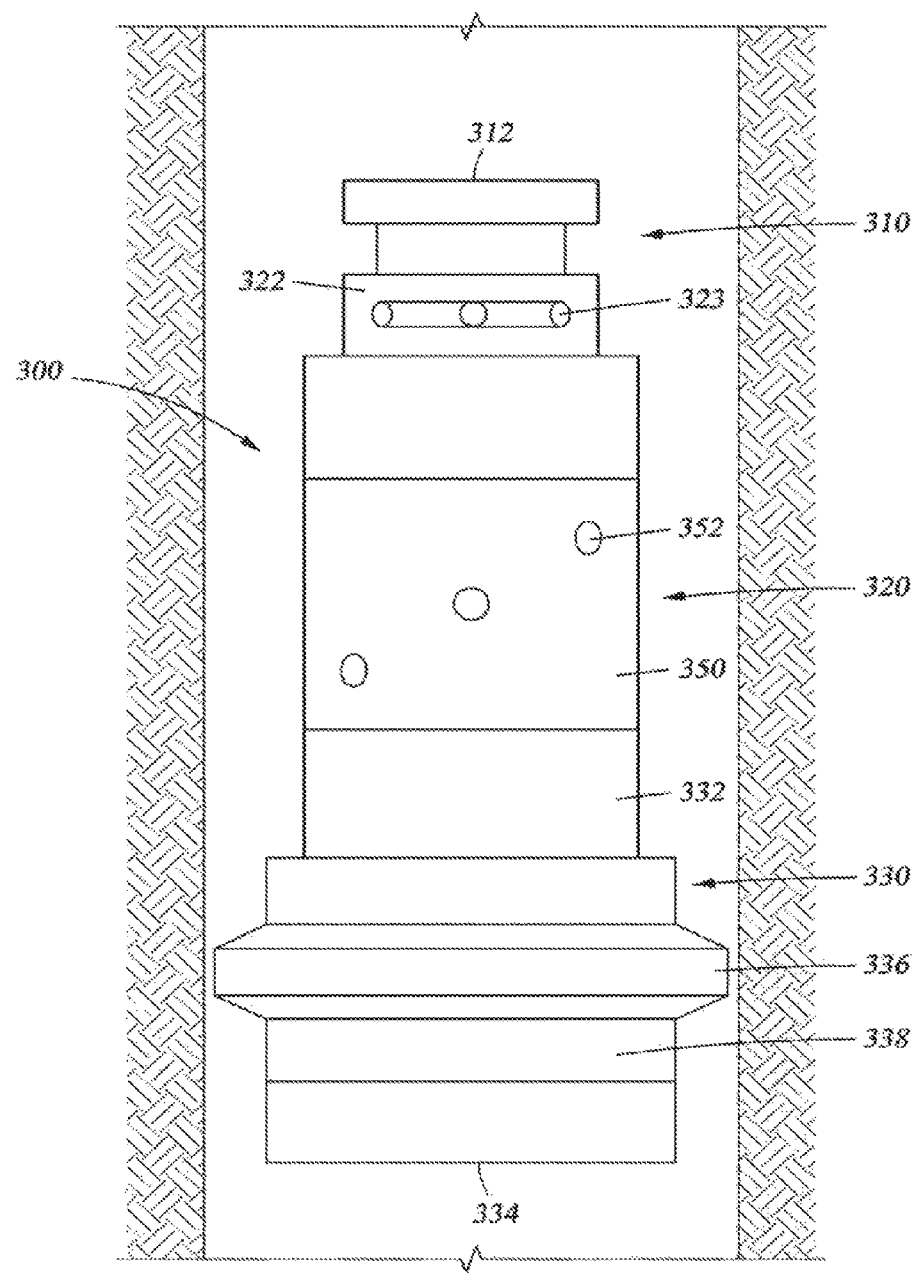
FIG. 6 shows a side view of another embodiment of plug deployed perforating tool.

An alternative embodiment of a pump down plug deployed perforating gun is shown as a tool 300 in FIG. 6. The tool 300 includes an upper retrieval portion 310 having a fishing neck 312 or other connection member. The fishing neck 312 is coupled to a firing head 322 of an intermediate portion 320. The firing head 322 includes ports 323 and internal control and communication elements for communicating with a perforating gun 350. The perforating gun 350 includes perforators 352. In some embodiments, the gun 350 includes one or more holes including charge carriers that make up the perforators 352. In an exemplary embodiment, there are approximately six holes with diameters in the range of 0.3 to 0.4 inches. A releasable connection 332 couples the perforating gun 350 to a lower plug portion 330 including a pump down plug 334. The plug 334 includes a latch down receiver 338 and wiper elements 336.

Figure 7:
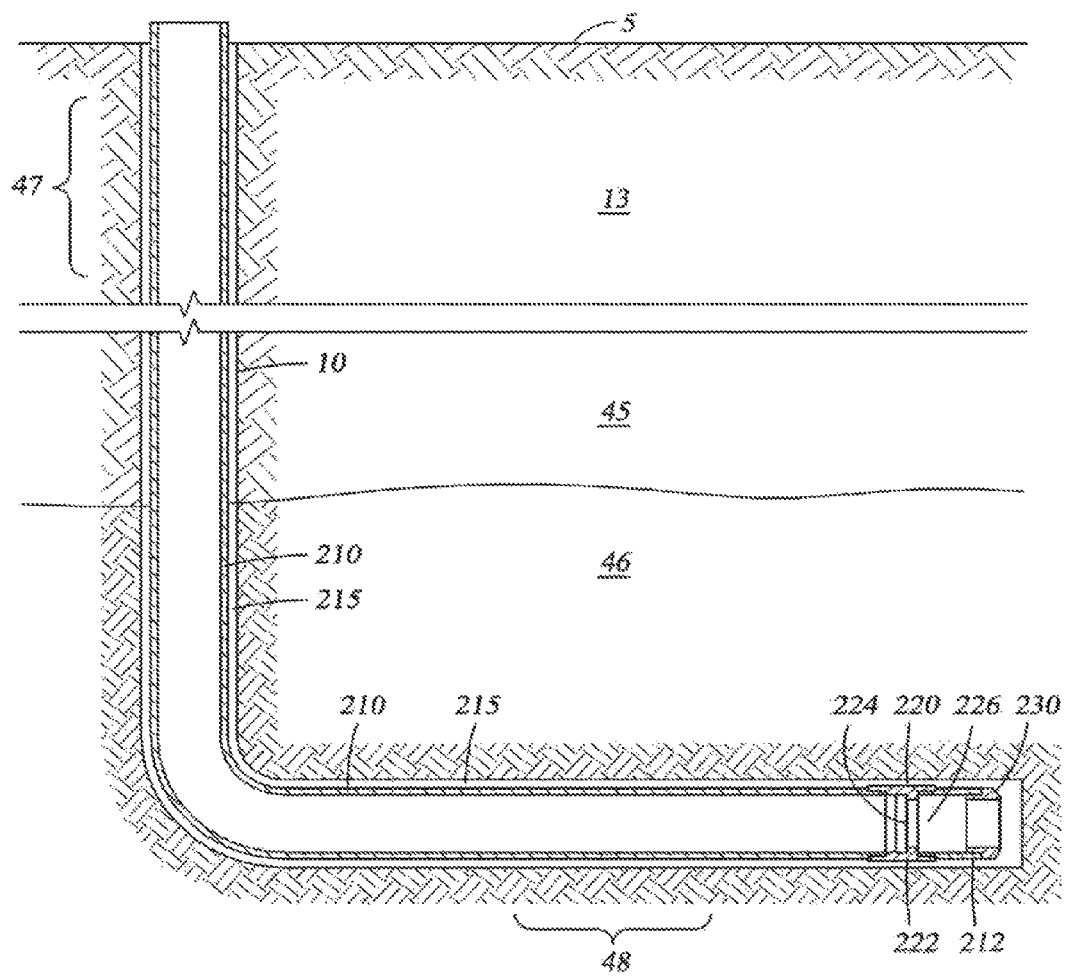
FIG. 7 shows the wellbore of FIG. 3 including an uninstalled casing string.

FIG. 7 shows various operations related to the plug deployed perforating tools 100, 300. As shown, a casing or liner string 210 is run into the wellbore 10, including the horizontal portion 48. This creates an annulus 215 with the borehole wall. The end portion 212 of the casing string 210 includes a latch down landing collar 220 coupled therein and having an outer portion 222 and an inner passageway 226 with an inner latch profile 224. Coupled to the casing string 210 below the landing collar 220 is a float shoe 230. Known apparatus are used for the process of conveying the casing string 210 into the wellbore 10.

Figure 8:
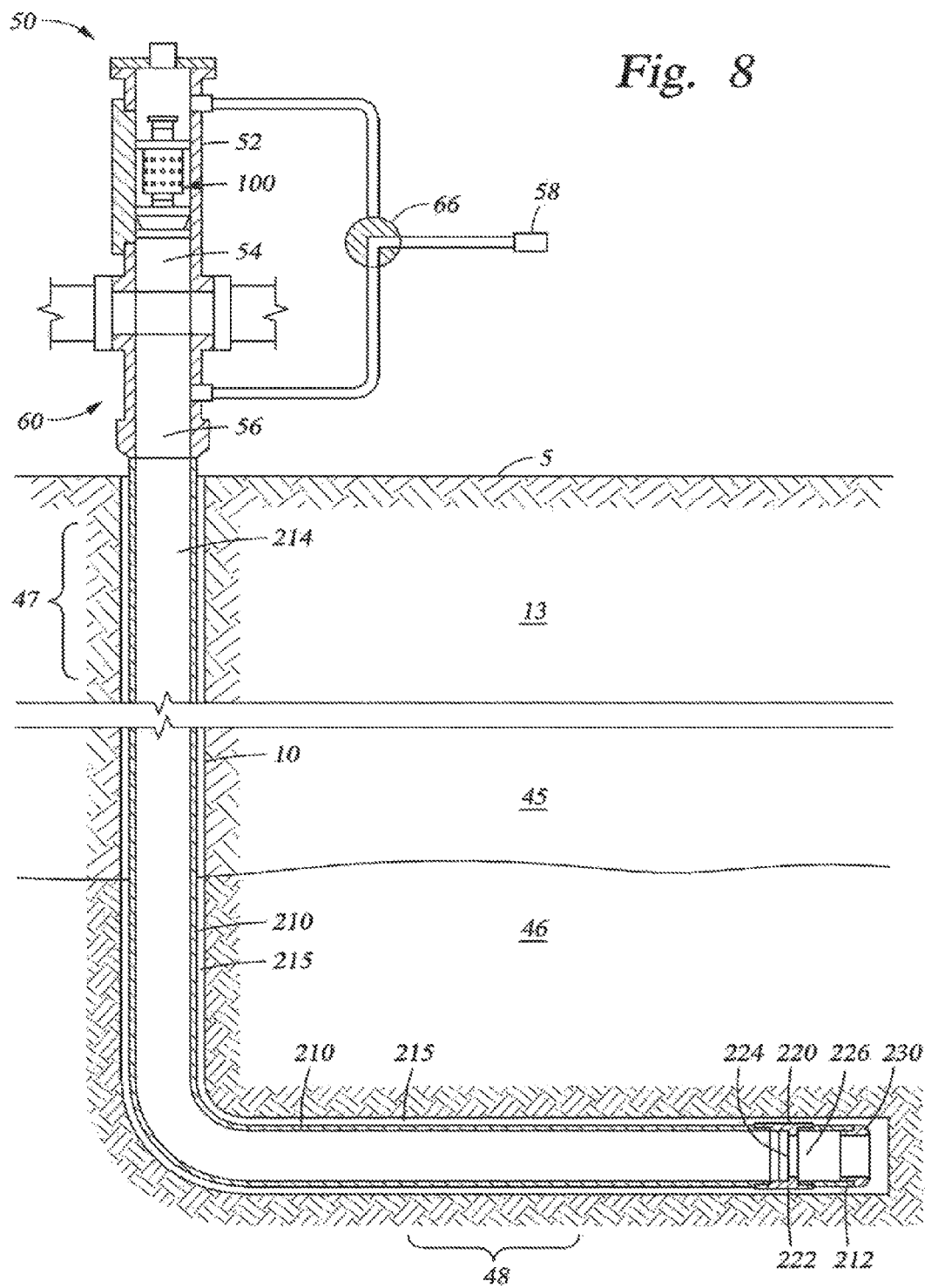
FIG. 8 shows the wellbore of FIG. 7 including a rig tree and a launcher for an embodiment of a plug deployed perforating tool.

FIG. 8 shows a rig tree 50 configured and installed at the surface 5. In some embodiments, the rig tree 50 includes a cement manifold or head 60 receiving the flow inlet line 58 and a launcher 52 coupled above the cement manifold 60. The launcher 52 includes a chamber 54 receiving the pump down plug deployed tool 100. In exemplary embodiments, the tool 300 is stored in the launcher 52 for use as described below. The chamber 54 extends into an outlet passageway 56 in the cement manifold 60 that communicates with the interior 214 of the casing string 210.

Figure 9:
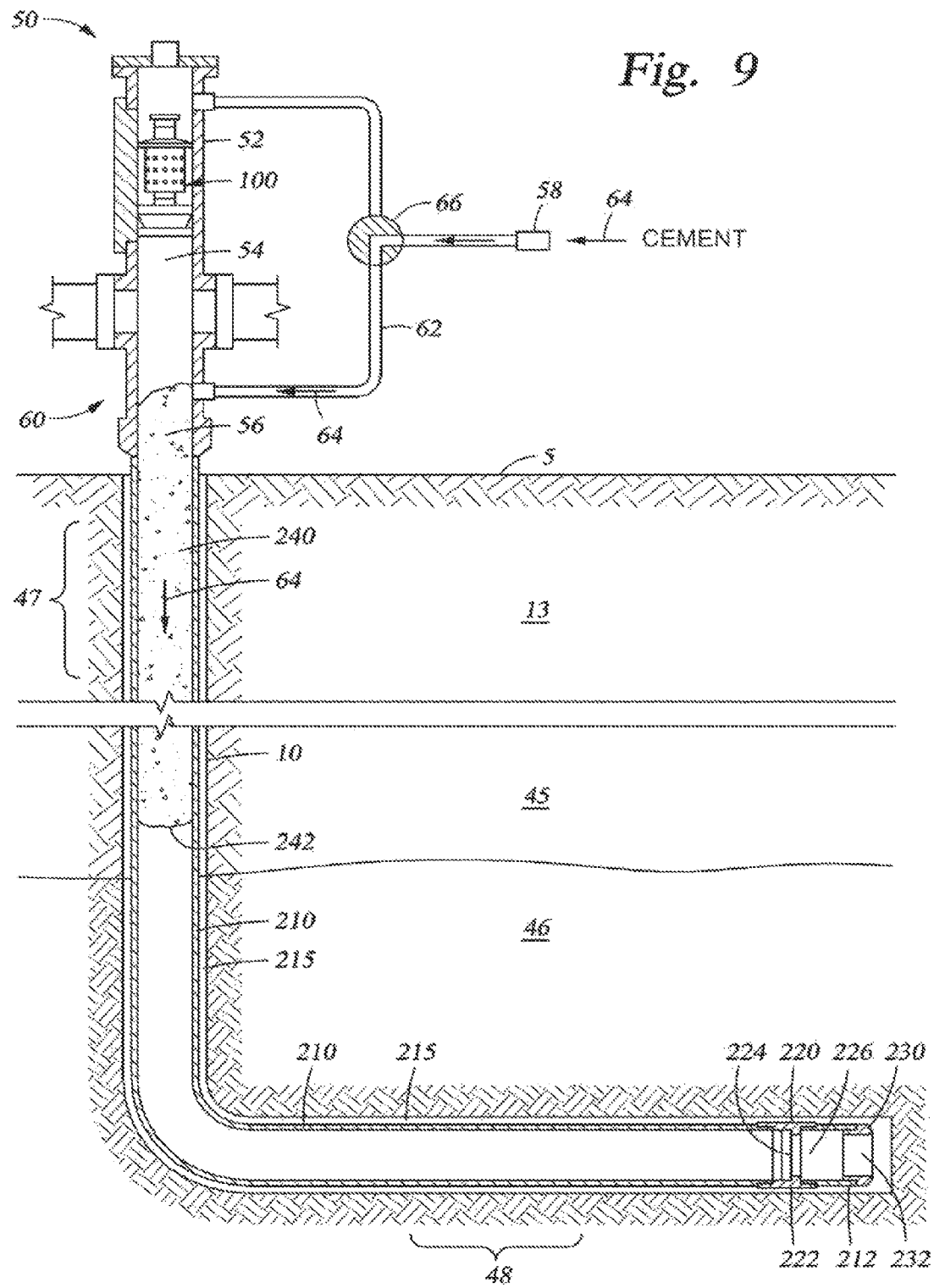
FIG. 9 shows the system of FIG. 8 with cement being pumped.

FIG. 9 shows cement being pumped through the inlet line 58 to create a cement slurry flow 64. The cement flow 64 is directed by a valve 66 through a bypass line 62 in the cement manifold 60 to bypass the tool launcher 52. The cement flow 64 is directed downward through the passageway 56 and into the casing 210 to form a column 240 of cement with a leading portion 242 being moved toward the end portion 212 of the casing string 210.

Figure 10:
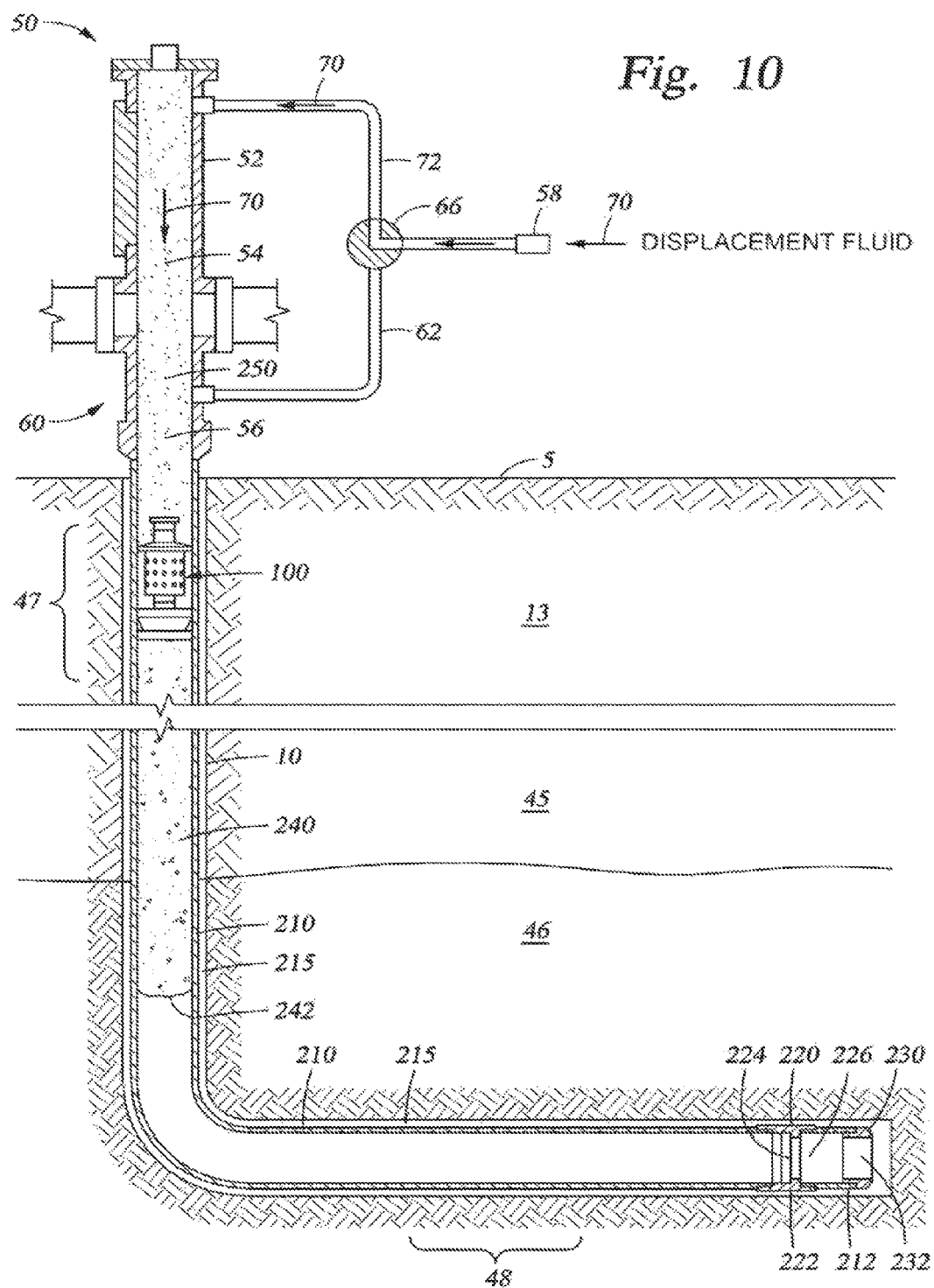
FIG. 10 shows the system of FIG. 9 with a displacement fluid being pumped to drive the plug deployed perforating tool and the cement.

FIG. 10 shows displacement fluid being pumped into line 58 and the valve 66 is actuated to re-direct a displacement fluid flow 70 through the alternate line 72 toward the upper part of the plug launcher 52. At approximately the same time, the plug launcher 52 is opened to release the plug deployed perforating tool 100. Known mechanisms for opening the plug launcher 52 and releasing the tool 100 are included in the system. The displacement fluid flow 70 ejects the tool 100 from the launcher chamber 54, and displaces the tool 100 downward through the passageway 56 and into the casing 210. A column 250 of pumped displacement fluid now drives the tool 100 and the leading cement column 240 through the interior of the casing string 210.

Figure 11:
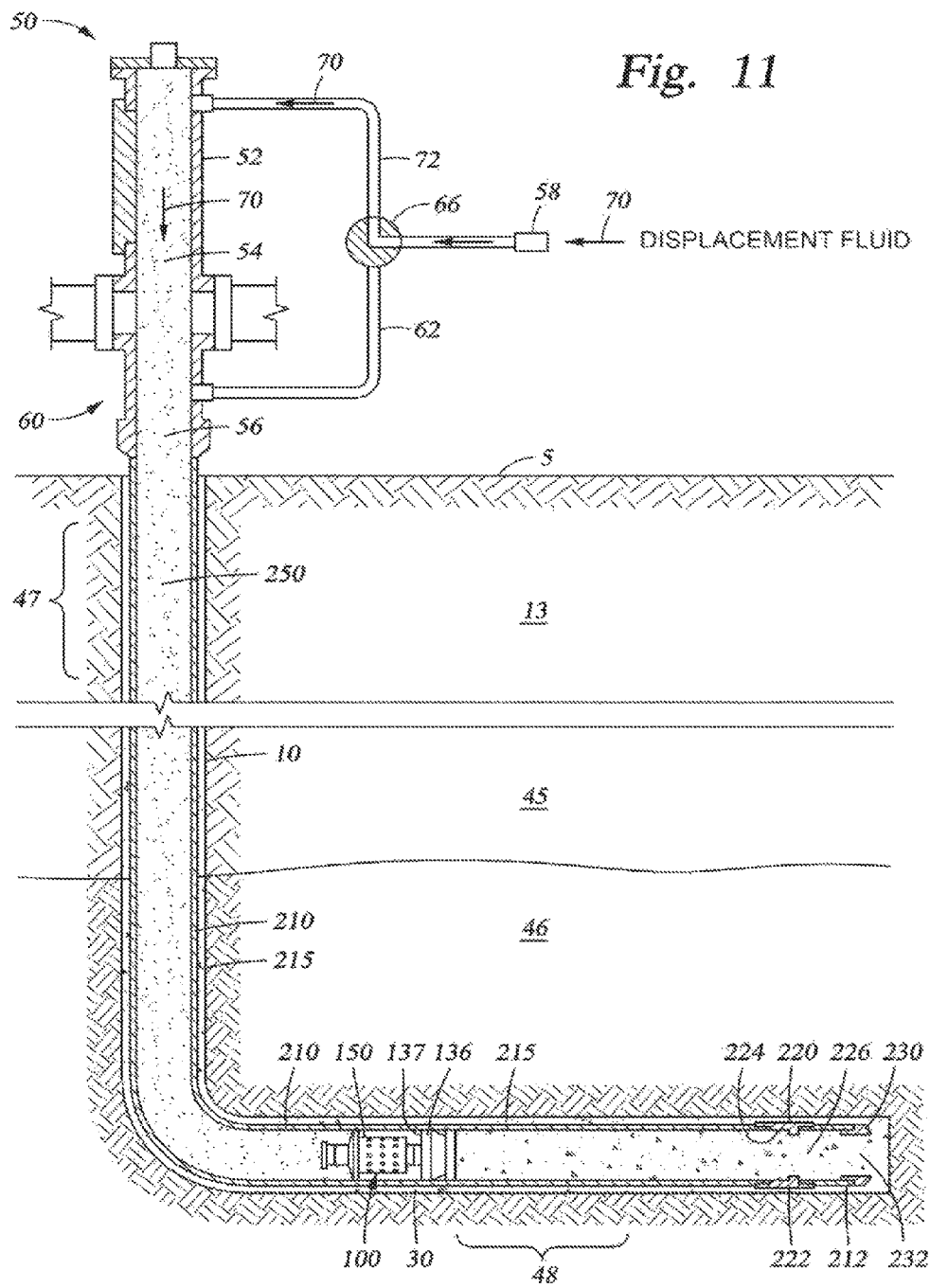
FIG. 11 shows the system of FIG. 10 with fluid being further displaced to dispose the cement into the casing string and wellbore annulus.

In FIG. 11, the displacement fluid flow 70 is continued by pumping, thereby pumping the tool 100 and the cement column 240 further into the casing string 210 in the horizontal portion 48. The cement 240 passes through the passageway 226 in the landing collar 220 and through a central passageway 232 in the float shoe 230. After exiting the float shoe 230, the cement slurry is re-directed into the annulus 215 and back up through the wellbore portion 30. The tool 100 is displaced by fluid pressure acting on the pressure member 137 in the plug 134. As the tool 100 is displaced through the casing string 210, the wiper element 136 cleans the interior surface of the casing string 210.

Figure 12:
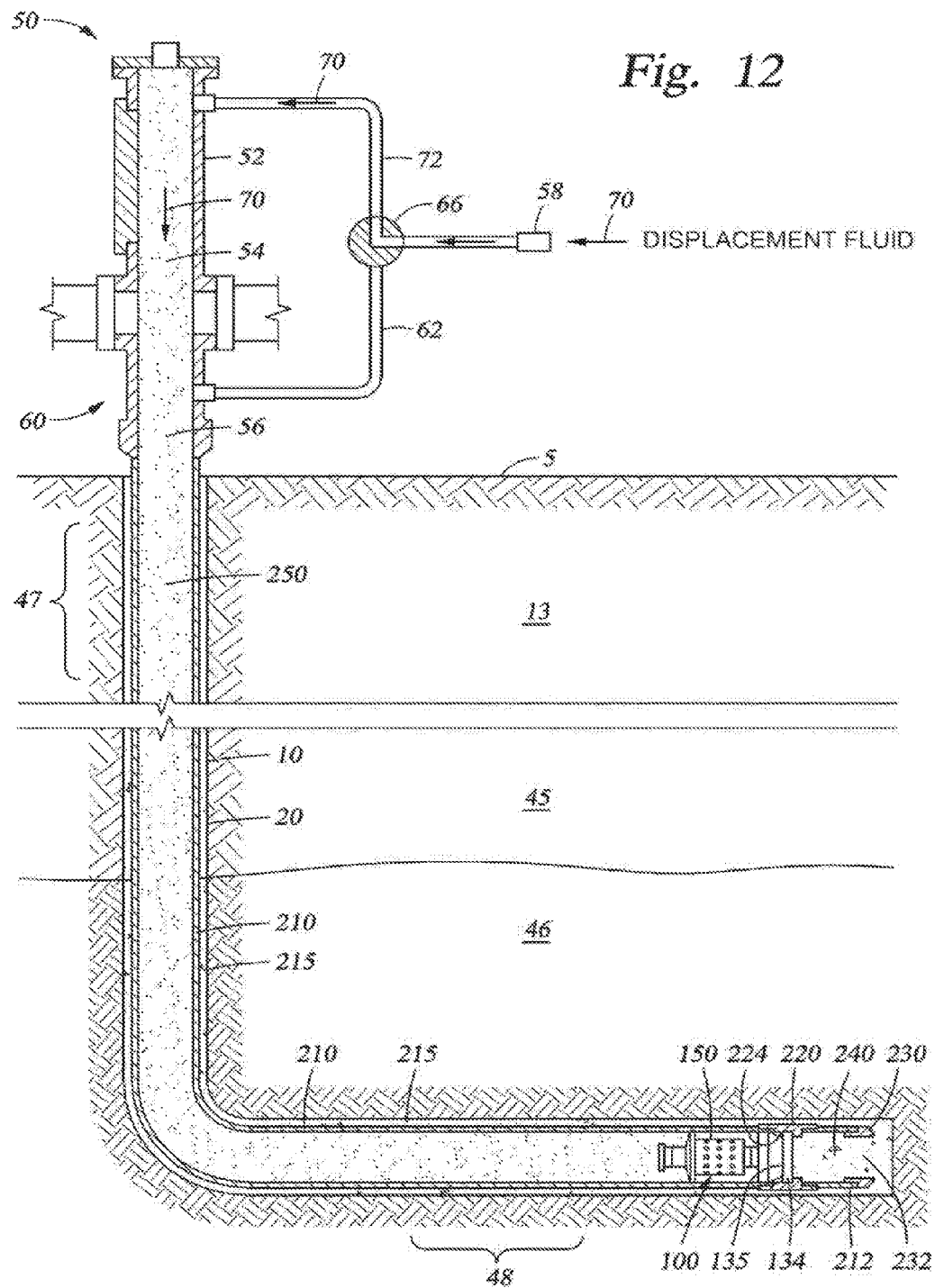
FIG. 12 shows the system of FIG. 11 with fluid being further displaced to dispose the plug deployed perforating tool into a latch down receiver and the cement fully into the casing string and wellbore annulus.

In FIG. 12, the pumped flow 70 continues to displace the fluid 250, the tool 100 and the cement 240 until the tool 100 arrives at the landing collar 220. The landing collar 220 receives the lower plug portion 134 of the tool 100 and the latch down receiver 135 latches into the landing collar profile 224. The pumped cement 240 has now filled the annulus 215 in both the horizontal portion 48 and the upper vertical portion 47 of the wellbore 10. In some embodiments, landing of the latch down plug into the landing collar will provide a pressure signal at the surface. In some embodiments, the signal is an indication to stop pumping of the displacement fluid, test the casing, provide a surge back, wait for the cement to set, or any combination thereof.

Figure 13:
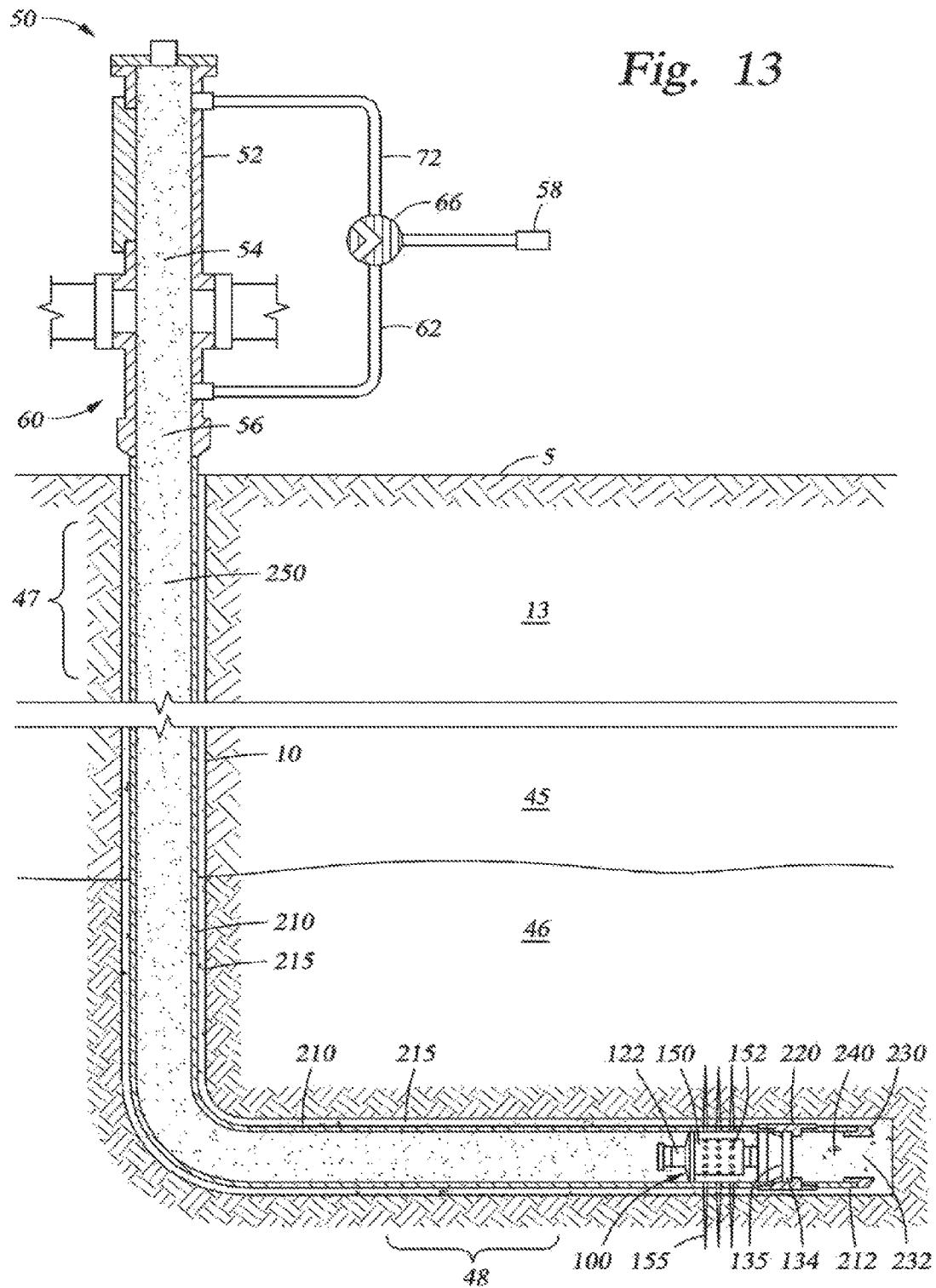
FIG. 13 shows the system of FIG. 12 with the plug deployed perforating tool being actuated to perforate the casing and/or formation.

After the cement has set, the perforating gun portion 150 of the plug deployed tool 100 is available for operation. In FIG. 13, the perforating gun 150 is fired by the firing head 122. The charges, explosive devices, or other perforating means in the perforating gun 150 are directed into and through the casing and formation to form the perforations or fractures 155. In some embodiments, the control circuitry and memory 124 of the firing head 122 are configured at the surface with a timing delay. The timing delay can be started at any time during the above described cementing process and before perforation. Once started, the timer is pre-set to allow for the displacement process of the tool 100 and the cement, as well as the setting time for the cement. At the end of the timing delay, the firing head is triggered internally to initiate or actuate the perforating gun 150. In other embodiments, the control components 124 of the firing head 122 include sensors and other apparatus for receiving a signal from the surface of the well. The sensor may be configured to receive a pressure signal initiated at the surface, or a control signal sent via telemetry or other known means for communicating downhole. Upon receipt of the external signal, the firing head 122 is initiated to direct actuation of the perforating gun 150.

Figure 14:
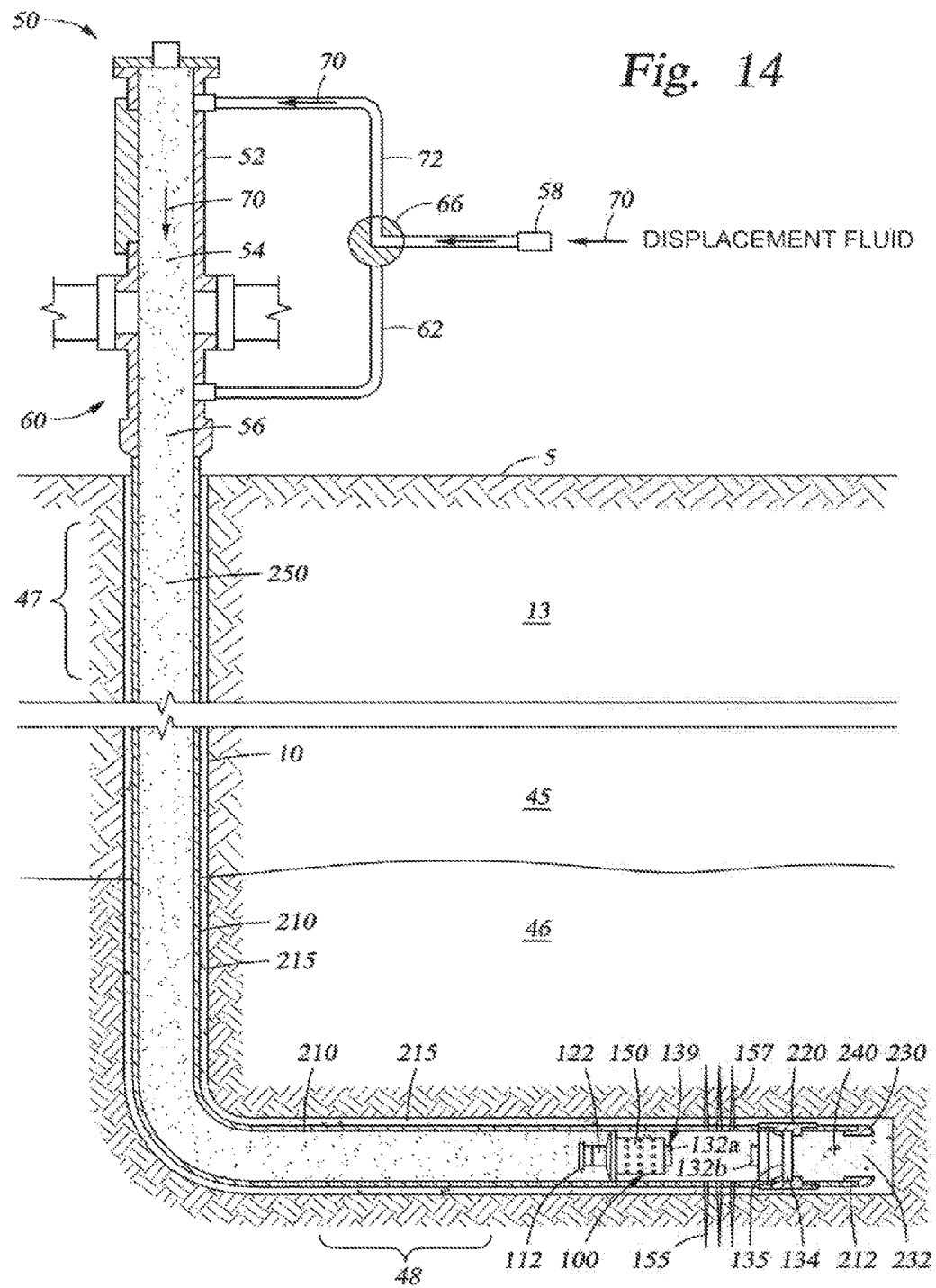
FIG. 14 shows the system of FIG. 13 with the perforating tool being released from the plug member and displaced from the perforated zone.

In FIG. 14, the gun 150 is automatically released at the releasable connection 132 in response to firing of the gun 150. The released connection 139 is achieved by decoupling the components 132*a*, 132*b* of the connection 132 of the assembled tool 100. The continuous pumping of the fluid 70 establishes fluid injection paths 157 through the fractures 155 while the engaged latch down plug 134 remains in place.

Figure 15:
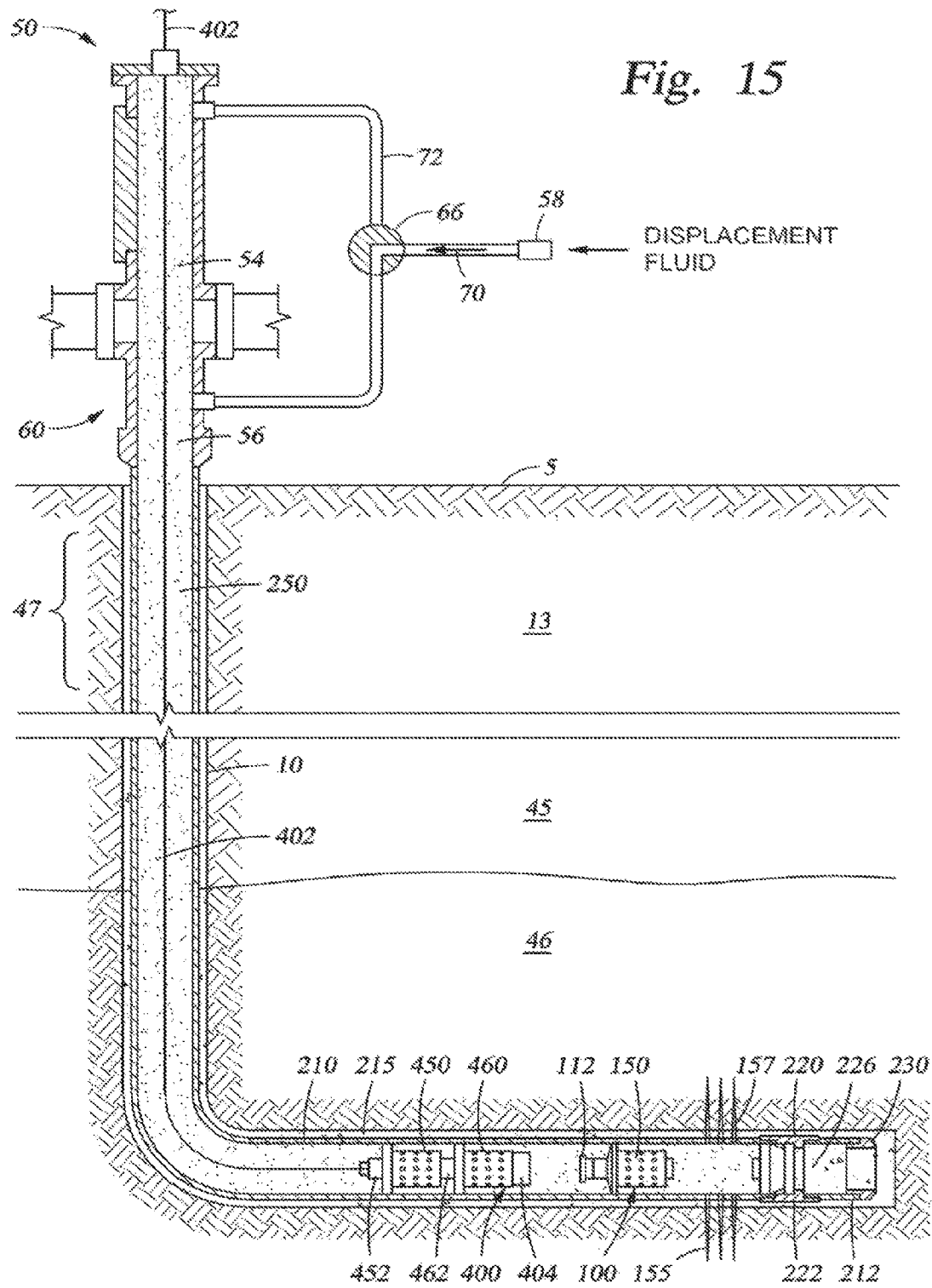
FIG. 15 shows the system of FIG. 14 with a retrieval or fishing tool being deployed into the wellbore toward the released perforating tool.

FIG. 15 shows an additional tool 400 being pumped down the wellbore 10 while the pumped fluid 250 continues to inject into the perforations 155. In exemplary embodiments, the tool 400 is a retrieval tool with a latch 404 to connect to the fishing neck 112 of the perforating gun 150. In other exemplary embodiments, the tool 400 is other kinds of tools. In still further embodiments, the tool 400 is an additional perforating gun assembly including a first perforating gun 450 with a firing head 452 coupled to a second perforating gun 460 with a firing head 462. The pumped down tool 400 is coupled to the surface via a line 402, which may be an electric line.

Figure 16:
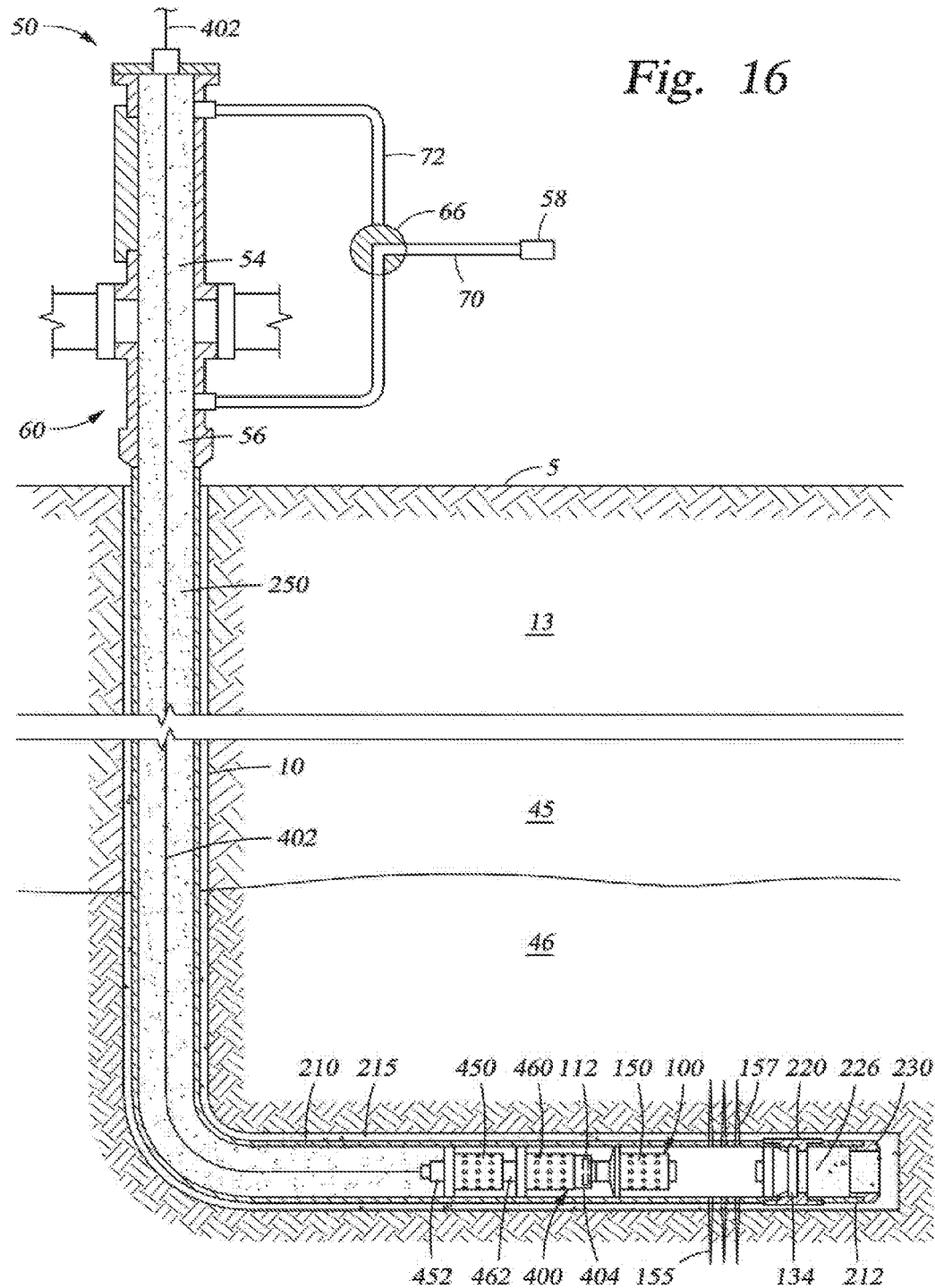
FIG. 16 shows the system of FIG. 15 with the retrieval or fishing tool being coupled to the perforating tool.
Figure 17:
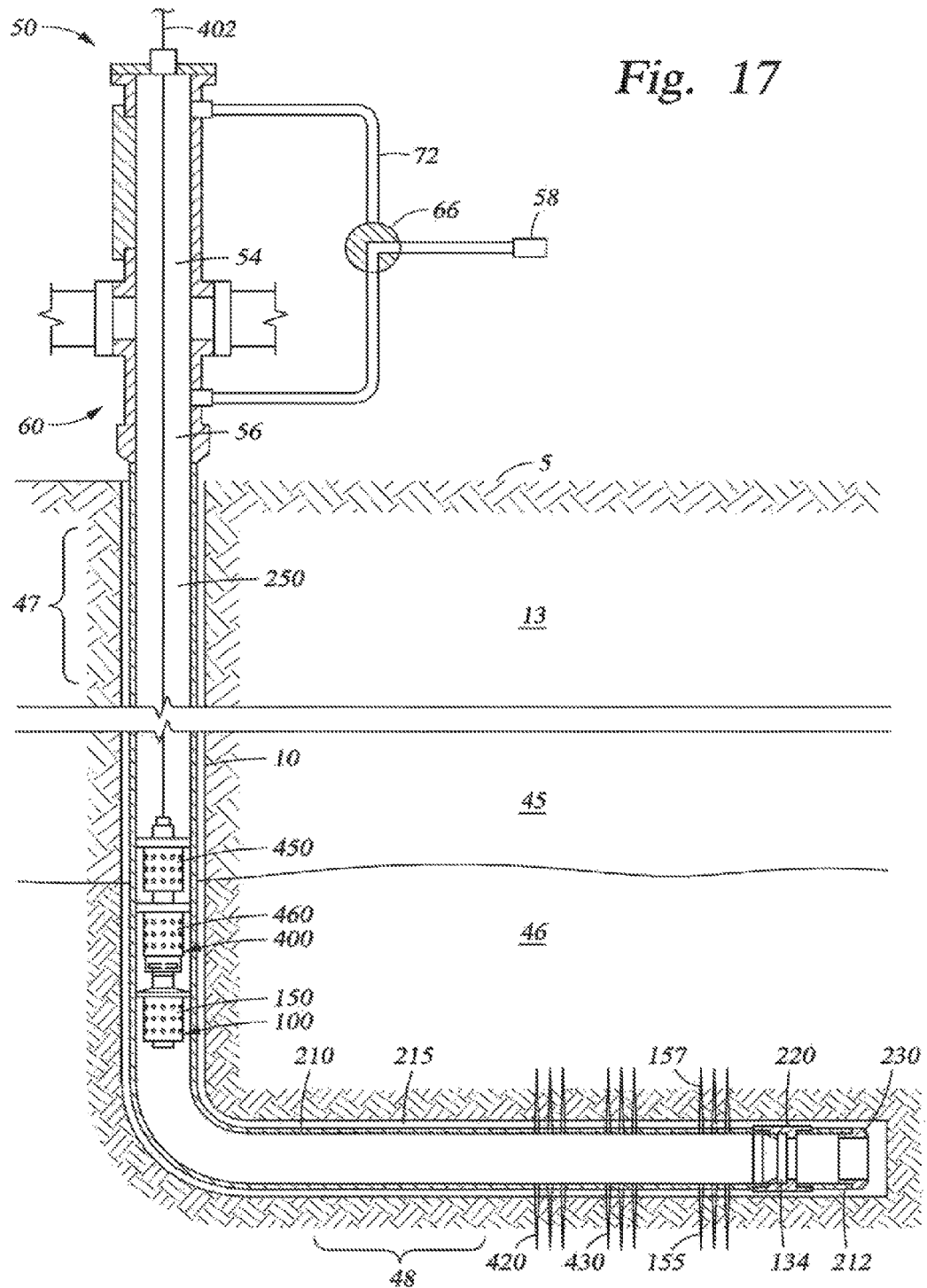
FIG. 17 shows an alternative system in accordance with the principles of the system of FIG. 16 with the perforating tool being actuated multiple times to perforate additional zones along the wellbore as the retrieval or fishing tool moves the perforating tool toward the surface.

Referring next to FIG. 16, in some embodiments, the additional tool 400 with retrieval capabilities is latched onto the released gun 150 by coupling the latch 404 to the fishing neck 112. The newly combined assembly 150/400 can now be pulled to the surface by the wireline or electric line 402. In FIG. 17, the released perforating device 150 has been removed from its deployment plug and being moved toward the surface 5. If the tool 400 includes additional perforating devices as taught herein, additional sets of perforations and fluid injection paths 420, 430 can be established by firing the perforating guns as the assembly 150/400 is moved up the well.

During the pump down operations described in FIGS. 7-17, automated monitoring and control of various operational parameters are performed. In at least some embodiments, the pump rate of a pump unit (or units), the line speed for a logging/perforating (L/P) unit, and the line tension for the L/P unit may be automatically monitored and controlled to enable efficient pump down operations. Of course, the automatic monitoring and control of parameters such as the driving force and driving rate of a driving unit (or units) for advancing the tool into the borehole, the line speed for a wireline unit, and the line tension for the wireline unit is useful for any wireline tool in which the tool is driven into the borehole (cased or uncased) and where it is desired to coordinate control of both the driving unit and the feed of the tool on the wireline. Such principles may be applied to any wireline logging tool, for example. Although a pumping unit is typical for use in pump down operations, other driving units are known which may be used for advancing wireline tools, such as powered tractors, and it is equally important that the driving force be balanced with wireline speed and wireline tension for such tools also.

As a specific example, suppose it is desired to run a plug at a line speed of 425 feet per minute in the vertical portion 47 of wellbore 10 and run the plug at a line speed of 375 feet per minute in the horizontal portion 48 of wellbore 10. Further, suppose the L/P control unit is always trying to hold 1,000 lbs of tension on tools going in the hole. For this set of desired parameters, the L/P control unit initially sets the line tension parameter at 1000 lbs and the line speed parameter at 425 ft/min (for vertical portion 47) and later 375 ft/min (for horizontal portion 48). In response, the tech control center (TCC)/pump control unit automates the pump rate to achieve the L/P variables. Once the wellhead is opened and the L/P unit starts down wellbore 10, the TCC/pump sets an auto pump rate that ramps up to the L/P variables (e.g., within 30 seconds or so). If any of these parameters change during the pump down operations, the other parameters will be adjusted automatically. The techniques disclosed herein improve safety of pump down operations by eliminating the possibility of pumping the tools off the end of the wireline cable or other catastrophes. Further, the automated control described herein is accomplished without operators adjusting throttles, drum brakes, and pumps.

After a well has been cemented and perforated and hydrocarbons have been extracted from the subterranean reservoir to the extent economically viable, it may sometimes be desirable to extract hydrocarbons from additional deposits or reservoirs at locations along the casing. In order to do so, the casing upstream of the new extraction point has to be isolated from the existing perforations downstream of the new extraction point. A plug-and-perf tool, similar to those described above in relation to FIGS. 4 to 6 could be used for such an operation. Instead of being housed in the launch chamber 54, the tool is pumped or otherwise driven down the casing from the surface, and is preferably attached to a wireline cable such as wireline cable 42. The upper and/or intermediate portion of the tool may include a firing head and perforating gun arranged in a similar way to those of the embodiments of FIGS. 4 to 6. The tool includes a lower plug portion similar to lower plug portions 130 and 330 described above, and may include a pump down plug, similar to plugs 134 and 334 of FIGS. 4 to 6, releasably coupled to the lower plug portion of the tool. In use, the tool is pumped or otherwise driven down the casing to a desired depth which is upstream of the existing perforations. Pumping the tool down the well is possible since the pumping fluid can be displaced into the reservoir from which hydrocarbons have already been extracted through the existing perforations. The depth of the tool in the casing may be determined by measuring the length of the wireline fed out.

The plug is then be deployed to seal off the lower, perforated section of the casing from the upstream portion. The plug may be deployed, for example, in response to a signal transmitted along the wireline, or otherwise via an alternative telemetry system. The plug then actuates or otherwise deploys to engage with the inner wall of the casing, in known fashion, to create a seal and isolate the upstream portion of the casing from the lower, perforated section. The perforating gun may then be detonated to perforate the casing and release the perforating gun from the plug, or may first be released from the plug and moved a desired distance upstream before being detonated. The perforating gun may be fired by a signal transmitted along the wireline or by a telemetry signal. Alternatively, the perforating gun may be set on a timer, to fire after a predetermined period of time has elapsed, as described above. As described above in relation to the tool of FIGS. 14 to 17, such a tool may include a plurality of perforating guns to create perforations at plural locations along the isolated upstream portion of the casing. Displacement fluid may then be pumped and injected into the formation through the newly formed perforations. The contemplated tool is wireline deployed, advantageously using the pump down control system described herein to control the pump rate, wireline speed and wireline tension. As such, the tool may be easily recovered to the surface via the wireline after all the perforating guns have been fired.

Figure 18:
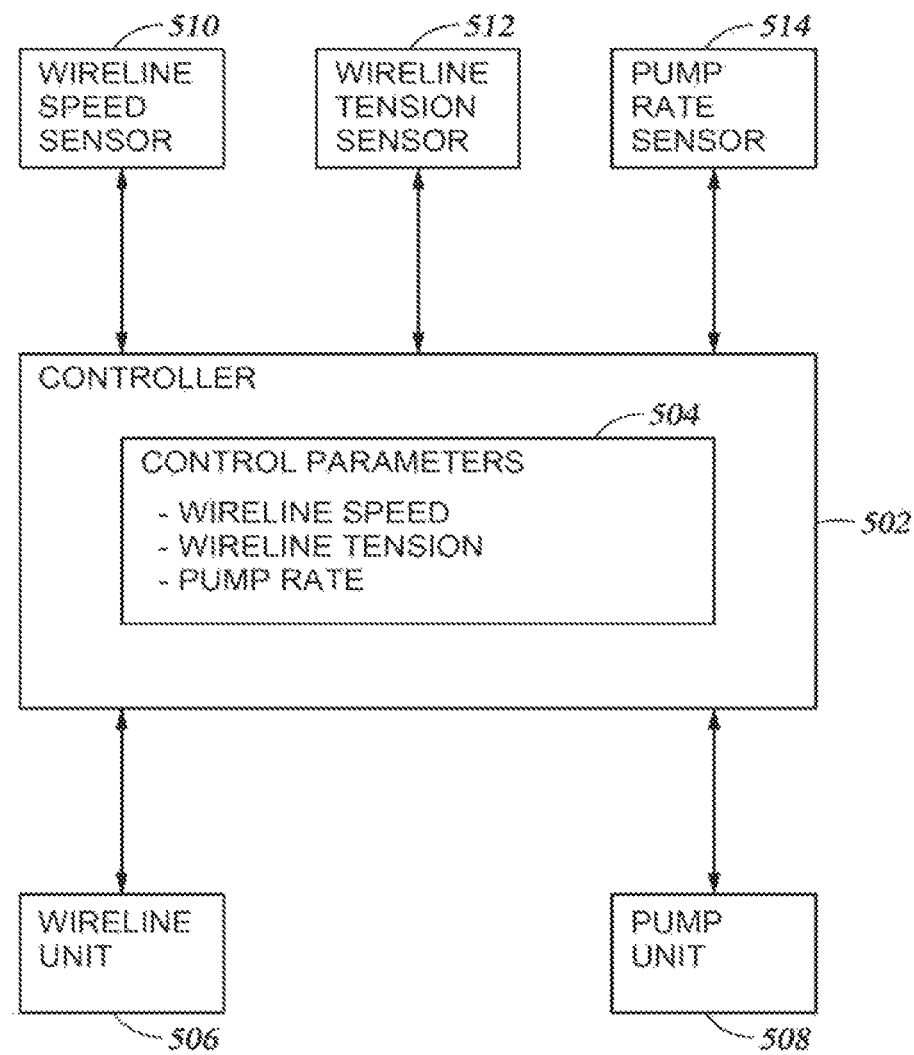
FIG. 18 illustrates a block diagram of a control system for pump down operations in accordance with an embodiment of the disclosure.

FIG. 18 illustrates a block diagram of a control system 500 for pump down operations, such as pump-and-perf, in accordance with an embodiment of the disclosure. The control system components are most usefully located at the surface, as part of the wireline unit, pumping unit or as part of a separate remote control unit. Surface control components facilitate access for maintenance and ensuring accurate control signal transmission to the wireline unit and pumping unit. It is equally possible, however, for some or all components of the control system to be installed on the downhole tool. Such an arrangement may be appropriate where it is desired to integrate the combined control functionality for the wireline unit and pumping unit into the tool itself (e.g., where the tool may be a separately provided integer from the wireline unit and is configured to interface with each of the wireline unit and the pumping unit. In such cases, the tool is ideally provided along with a remote input/output device for monitoring and/or setting control parameters for the tool/control system from the surface. As shown, the control system 500 comprises a controller 502 coupled to a wireline unit 506 and to a pump unit 508. The controller 502 may replace one or both of the individual controllers usually provided to each of the wireline unit 506 and pump unit 508. Where only one of the individual controllers is replaced, the controller 502 is configured to interface with the existing controller of the other unit. Alternatively, an entirely separate controller 502 may be provided that is configured to interface with the existing individual control units of both the wireline unit 506 and pumping unit 508. Advantageously, the controller 502 may be configured to interface with the individual control units of a wide range of existing pumping units and wireline units, making the controller adaptable to different wireline and pumping equipment, including the equipment of different manufacturers and/or a variety of different wireline tools. In some applications, the interface between controller 502 and the pumping unit 508 and/or wireline unit 506 may be wireless, for example via WiFi, Bluetooth or over a telephone or internet connection, for example. Appropriate transmitter/receiver equipment may be connected to the wireline unit 506 and pumping unit 508 to permit the controller 502 to interface with them. The controller 502 is thereby able to be configured to provide commands to the wireline unit 506 to control wireline movement during pump down operations, such as pump-and-perf operations. The controller 502 may also be configured to provide commands to the pump unit 508 to control pumping during pump down operations. This may obviate the necessity for a separate operator to control each of the wireline unit 506 and the pumping unit 508, the pump down operation able to proceed either entirely automatically under the control of controller 502, or with input from a single operator into the controller 502. In at least some embodiments, the controller 502 relies on control parameters 504 (e.g., a wireline speed parameter, a wireline tension parameter, and a pump rate parameter) to generate appropriate commands to the wireline unit 506 and pump unit 508.

Data corresponding to the control parameters 504 are received from system sensors, which are arranged to monitor the respective control parameters from appropriate locations on the pumping unit, wireline unit and/or wireline tool, or otherwise on the drilling platform or in the wellbore, and are coupled to the controller 502. Pressure also may be monitored by the controller 502 to account for pumping limitations.

In at least some embodiments, a wireline speed sensor 510, a wireline tension sensor 512, and a pump rate sensor 514 provide sensor data to the controller 502. Other sensor data might be relayed to the controller, for example relating to the position and/or orientation of the wireline tool in the wellbore. The sensor data from the wireline speed sensor 510 may correspond directly to wireline speed data or to data that enables the wireline speed to be calculated. The sensor data from the wireline tension sensor 512 may correspond directly to wireline tension data or to data that enables the wireline tension to be calculated. The sensor data from the pump rate sensor 514 may correspond directly to pump rate data or to data that enables the pump rate to be calculated.

During pump down operations, such as pump-and-perf, the controller 502 analyzes new sensor data from the sensors 510, 512, 514 and is configured to automatically direct the pump unit 508 to adjust its pump rate in response to changes in a monitored wireline speed and/or monitored wireline tension. Additionally, the controller 502 may automatically direct the wireline unit 506 to adjust its wireline speed in response to changes in a monitored pump rate. For example, the controller 502 may direct the pump unit 508 to increase its pump rate in response to a decrease in the monitored wireline speed in order to maintain the speed at which the tool is advanced. Of course, this action assumes the wireline tension to be unchanging, or changing proportional to speed. If, to the contrary, the wireline tension is decreasing at a non-proportional rate to the rate at which the speed is decreasing, this would likely indicate that the tool is entering debris, and the appropriate action would then be to decrease the pump rate, or shut off the pump altogether, in order to prevent getting the tool getting stuck. It will therefore be appreciated that control of the pump rate in dependence on the wireline speed will preferably also be dependent upon the wireline tension. Additionally or alternatively, the controller 502 may direct the wireline unit 506 to reduce its wireline speed and/or direct the pump unit 508 to reduce its pump rate in response to an increase in the monitored wireline tension. In at least some embodiments, comparisons of control parameter values to predetermined threshold values (e.g., greater than or less than comparisons) for wireline speed, wireline tension, and pump rate may be considered by the controller 502 in addition to (or instead of) directional changes (an increase/decrease) for the control parameters.

Figure 19A:
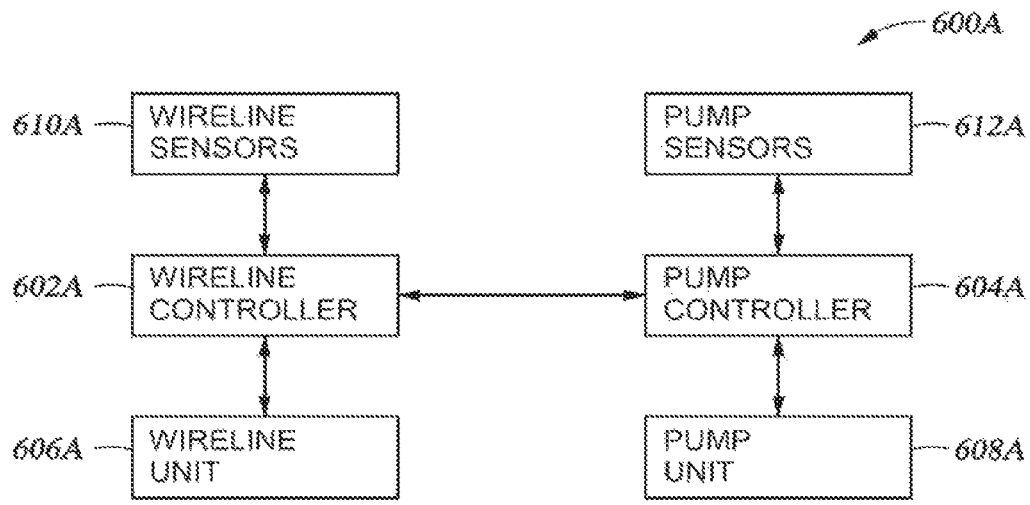
FIGS. 19A-19B illustrate other control systems for pump down operations in accordance with embodiments of the disclosure.
Figure 19B:
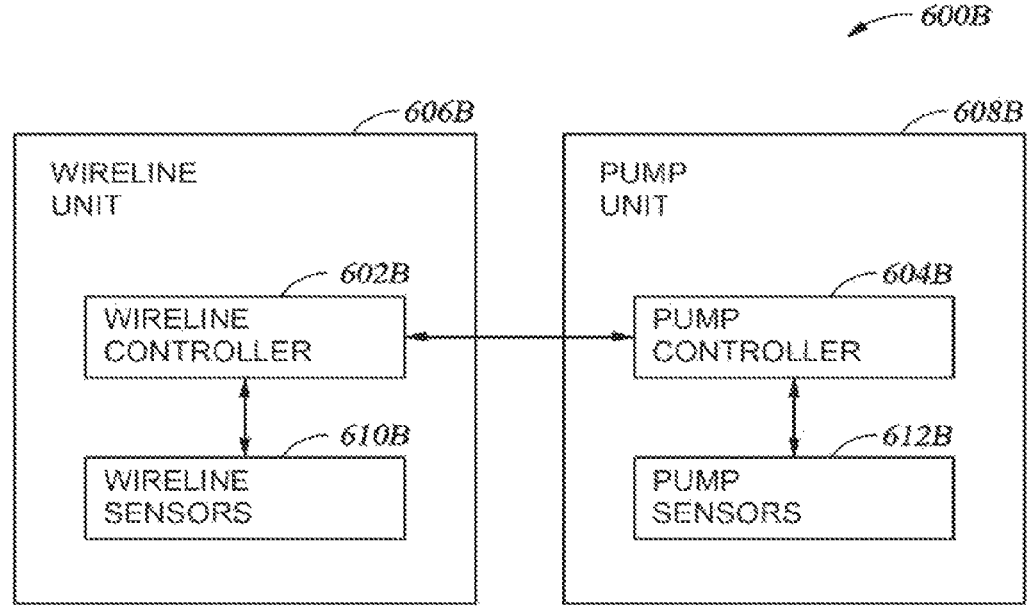

FIGS. 19A-19B illustrate other control systems which may be distributed between the wireline unit 506, pumping unit 508, the wireline tool, and a separate controller, as desired. The distributed control systems are suitable for controlling pump down operations, such as pump-and-perf, in accordance with embodiments of the disclosure. As an example, the pumping unit may use advanced cement evaluation (ACE™) software as a control system while wireline trucks use a different system. The various control systems for different units need to be the same, but would have to interface with each other, or to a separate controller.

In system 600A of FIG. 19A, distributed control of a wireline unit 606A and a pump unit 608A are illustrated. In other words, the wireline controller 602A and the pump controller 604A perform the functions described for the controller 502, except in a distributed manner. More specifically, wireline controller 602A directs commands to the wireline unit 606A, while pump controller 604A directs commands to the pump unit 608A. In order to account for changes that may occur in the control parameters (e.g., wireline speed, wireline tension, and pump rate), the wireline controller 602A and the pump controller 604A are configured to communicate. Such changes may be detected based on sensor data gathered from wireline sensors 610A coupled to the wireline controller 602A. Additionally, the pump controller 604A may gather sensor data from pump sensors 612A coupled thereto. The amount of information exchanged between wireline controller 602A and pump controller 604A may vary for different embodiments. For example, wireline controller 602A and pump controller 604A may be configured to exchange sensor data periodically. Additionally or alternatively, wireline controller 602A and pump controller 604A may be configured to send requests as needed (e.g., the wireline controller 602A may request that the pump controller 604A reduce the pump rate or the pump controller 604A requests that the wireline controller 602A reduce the wireline speed). The amount of reduction related to each request may be communicated with the request, deduced, or preset for each controller 602A, 604A. Increases in pump rate and wireline speed are likewise possible and may be requested between distributed controllers such as controllers 602A and 604A.

In system 600B of FIG. 19B, another embodiment of distributed controllers for pump down operations is illustrated. As shown, wireline controller 602B and wireline sensors 610B are incorporated into wireline unit 606B. Similarly, pump controller 604B and pump sensors 612B are incorporated into pump unit 608B. In at least some embodiments, the wireline unit 606B and the pump unit 608B are configured to communicate to each other to automate control of a pump rate and wireline speed during pump down operations. Wireline tension also may be considered and may affect the control of both the pump rate and the wireline speed during pump down operations. Similar to the discussion of FIG. 19A, the amount of information exchanged between wireline controller 602B and pump controller 604B may vary for different embodiments. In various embodiments, sensor data, notifications, and/or requests may be sent from one distributed controller to the other.

Figure 20:
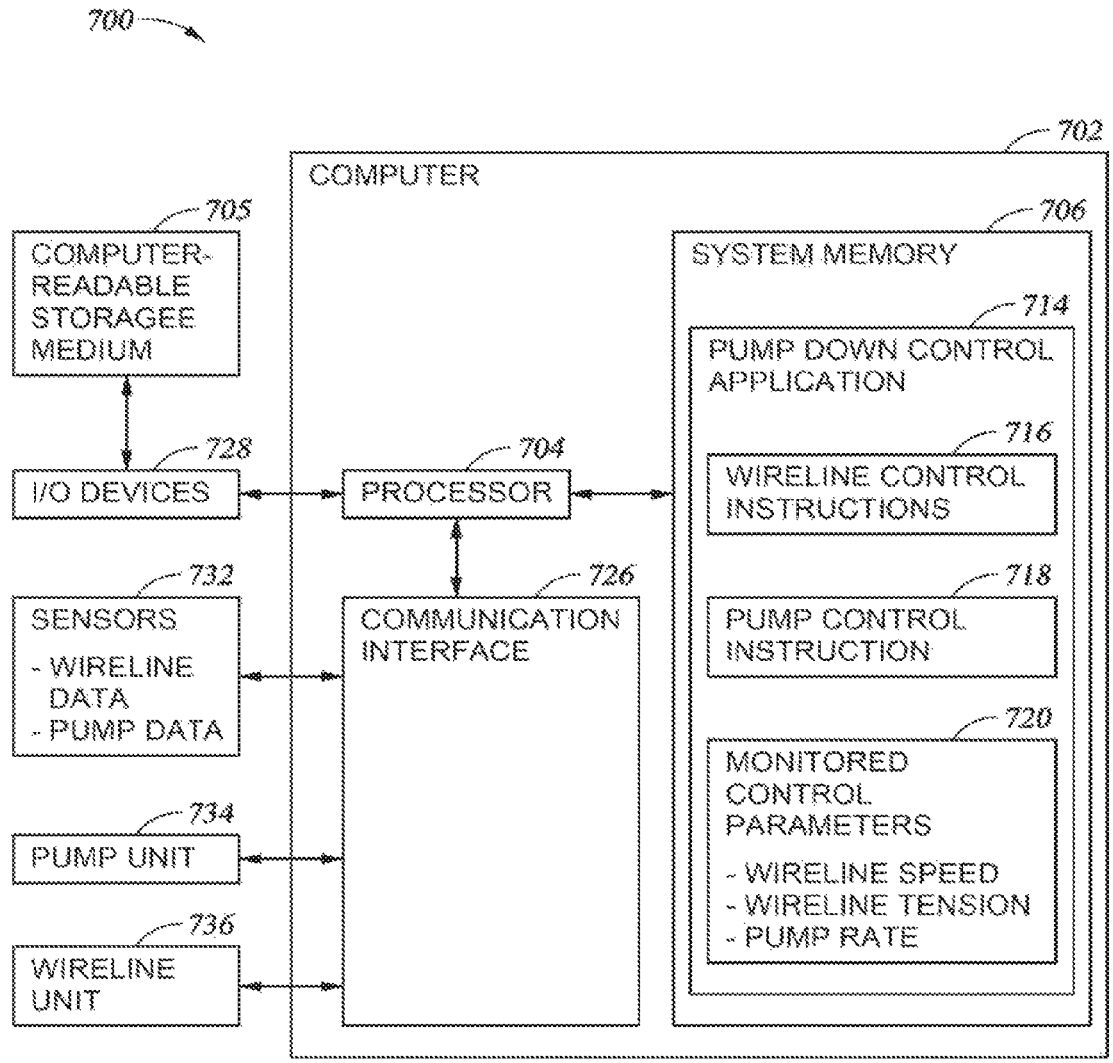
FIG. 20 illustrates a computer system used with pump down operations in accordance with an embodiment of the disclosure.

The controller 502 of FIG. 18 and/or the controllers 602A,B and 604A,B of FIGS. 19A-19B may correspond to any of a variety of hardware controllers. In some embodiments, such controller may correspond to hardware/firmware/software systems. As an example, FIG. 20 illustrates a computer system 700 used with pump down operations in accordance with an embodiment of the disclosure. The computer system 700 comprises a computer 702 with one or more processors 704 coupled to a system memory 706. Some embodiments of the computer 702 also include a communication interface 726 and I/O devices 728 coupled to the processor 704. The computer 702 is representative of a desktop computer, server computer, notebook computer, handheld computer, or smart phone, etc.

The processor 704 is configured to execute instructions read from the system memory 706. The processor 704 may, for example, be a general-purpose processor, a digital signal processor, a microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The system memory 706 corresponds to random access memory (RAM), which stores programs and/or data structures during runtime of the computer 702. For example, during runtime of the computer 702, the system memory 706 may store a pump down control application 714, which is loaded into the system memory 706 for execution by the processor 704.

The system 700 also may comprise a computer-readable storage medium 705, which corresponds to any combination of non-volatile memories such as semiconductor memory (e.g., flash memory), magnetic storage (e.g., a hard drive, tape drive, etc.), optical storage (e.g., compact disc or digital versatile disc), etc. The computer-readable storage medium 705 couples to I/O devices 728 in communication with the processor 704 for transferring data/code from the computer-readable storage medium 705 to the computer 702. In some embodiments, the computer-readable storage medium 705 is locally coupled to I/O devices 728 that comprise one or more interfaces (e.g., drives, ports, etc.) to enable data to be transferred from the computer-readable storage medium 705 to the computer 702. Alternatively, the computer-readable storage medium 705 is part of a remote system (e.g., a server) from which data/code may be downloaded to the computer 702 via the I/O devices 728. In such case, the I/O devices 728 may comprise networking components (e.g., a network adapter for wired or wireless communications). Regardless of whether the computer-readable storage medium 705 is local or remote to the computer 702, the code and/or data structures stored in the computer-readable storage medium 705 may be loaded into system memory 706 for execution by the processor 704. For example, the pump-and-perf control application 714 or other software/data structures in the system memory 706 of FIG. 20 may have been retrieved from computer-readable storage medium 705.

The I/O devices 728 also may comprise various devices employed by a user to interact with the processor 704 based on programming executed thereby. Exemplary I/O devices 728 include video display devices, such as liquid crystal, cathode ray, plasma, organic light emitting diode, vacuum fluorescent, electroluminescent, electronic paper or other appropriate display panels for providing information to the user. Such devices may be coupled to the processor 704 via a graphics adapter. Keyboards, touchscreens, and pointing devices (e.g., a mouse, trackball, light pen, etc.) are examples of devices includable in the I/O devices 728 for providing user input to the processor 704 and may be coupled to the processor by various wired or wireless communications subsystems, such as Universal Serial Bus (USB) or Bluetooth interfaces.

As shown in FIG. 20, the pump down control application 714 comprises wireline control instructions 716, pump control instructions 718 and control parameters 720. When executed, the wireline control instructions 716 operate to generate commands for a wireline unit 736 coupled to the computer 702 via the communication interface 726. Likewise, the pump control instructions 718, when executed, operate to generate commands for a pump unit 734 coupled to the computer 702 via the communication interface 726. The generation of commands by the wireline control instructions 716 and the pump control instructions 718 may be based on monitored control parameters 720 such as wireline speed, wireline tension and/or pump rate. The monitored control parameters 720 may be received during pump down operations from sensors 732 coupled to the communication interface 726. Alternatively, the sensors 732 provide wireline data and pump data from which the monitored control parameters 720 are calculated. In either case, the received or derived control parameters 720 are stored in the computer 702 for access by the pump down control application 714.

In at least some embodiments, the commands generated by the pump control instructions 718 for the pump unit 734 cause the pump unit 734 to change its pump rate. For example, the pump control instructions 718 may generate a reduce pump rate command for the pump unit 734 in response to an increase the monitored wireline speed and/or an increase in the monitored wireline tension. Alternatively, the pump control instructions 718 may generate an increase pump rate command for the pump unit 734 in response to a decrease in the monitored wireline speed and/or a decrease in the monitored wireline tension. Further, the wireline control instructions 716 may generate a decrease wireline speed command for the wireline unit 736 in response to a decrease in the monitored pump rate. In this manner, efficiency of pump down operations is improved while also considering safety thresholds.

Figure 21:
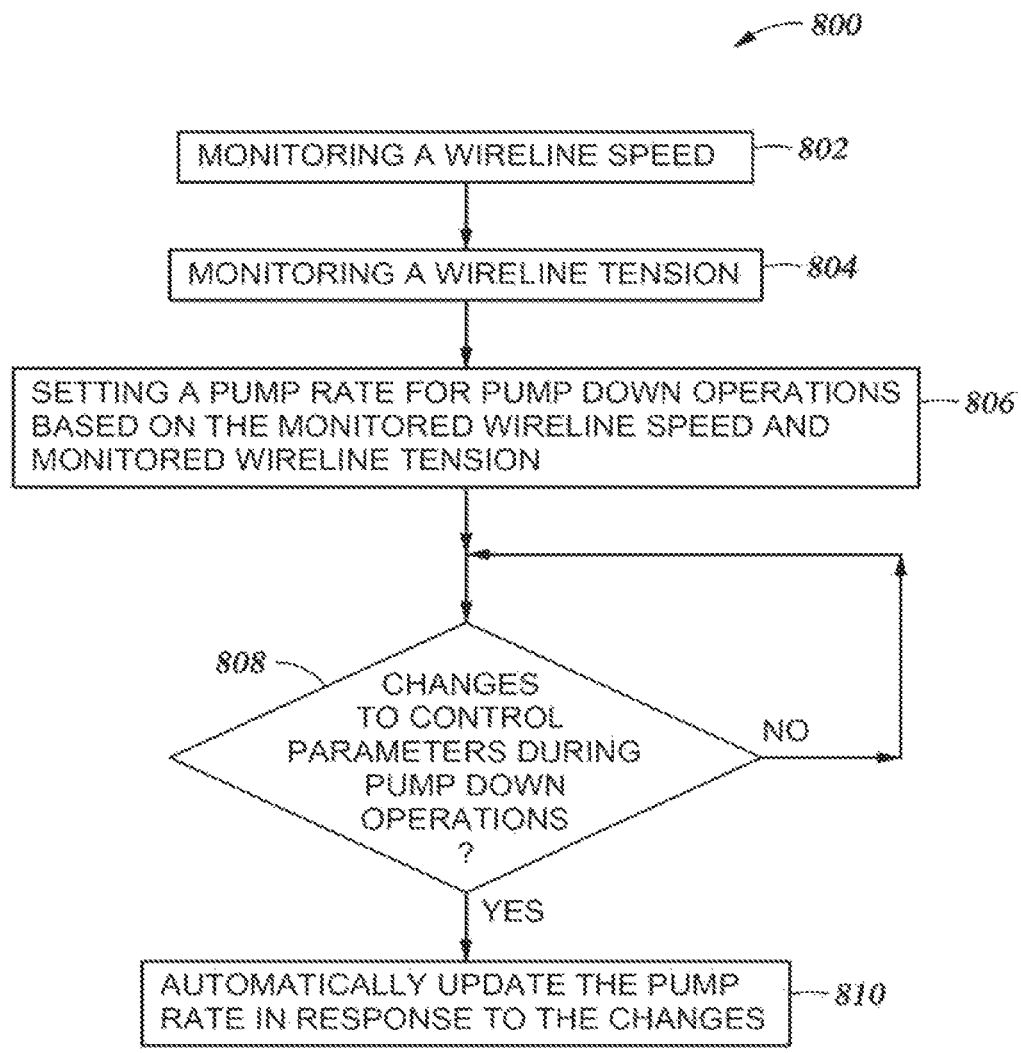
FIG. 21 illustrates a method in accordance with an embodiment of the disclosure.

FIG. 21 illustrates a method 800 in accordance with an embodiment of the disclosure. Though depicted sequentially as a matter of convenience, at least some of the actions shown can be performed in a different order and/or performed in parallel. Additionally, some embodiments may perform only some of the actions shown. In some embodiments, the operations of FIG. 21, as well as other operations described herein, can be implemented as instructions stored in a computer-readable storage medium (e.g., computer-readable storage medium 705) and executed by a processor (e.g., processor 704).

The method 800 starts by monitoring a wireline speed (block 802) and monitoring a wireline tension (block 804). The monitoring may be performed by sensors in communication with a hardware controller or a computer running software. In some embodiments, pressure and rate sensors could be monitored, if need be, from a transducer and flowmeter in the line rather than from the pump directly. A pump rate for pump down operations is then set based on the monitored wireline speed and monitored wireline tension (block 806). If changes to control parameters occur during pump down operations (determination block 808), the pump rate is automatically updated in response to the changes (block 810). In at least some embodiments, the control parameters correspond to the monitored wireline speed and the monitored wireline tension. For example, the pump rate may be decreased during pump down operations in response to a reduction in the monitored wireline speed. The amount of decrease in the pump rate may correspond to the difference between the monitored wireline speed and a predetermined threshold. The method 800 may additionally comprise receiving sensor data and determining the wireline speed and the wireline tension from the sensor data. Further, the method 800 may additionally comprise changing a wireline speed in response to a monitored pump rate during pump down operations.

The embodiments set forth herein are merely illustrative and do not limit the scope of the disclosure or the details therein. It will be appreciated that many other modifications and improvements to the disclosure herein may be made without departing from the scope of the disclosure or the inventive concepts herein disclosed. Because many varying and different embodiments may be made within the scope of the inventive concept herein taught, including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A system for pump down operations in a wellbore, comprising:
   a wireline unit;
   a pump unit to pump fluid into the wellbore; and
   a controller coupled to the wireline unit and the pump unit, wherein the controller is to automate at least one of: a pump rate for the pump unit based on at least one of a monitored wireline speed and a monitored wireline tension for the wireline unit; and a wireline speed for the wireline unit based on at least a monitored pump rate for the pump unit.

2. The system of claim 1 wherein the controller is to automate the pump rate based on a monitored wireline speed unless the monitored wireline tension reaches a predetermined tension threshold, after which the controller is to automatically reduce the wireline speed of the wireline unit and the pump rate.

3. The system of claim 1 further comprising a speed sensor in communication with the controller, wherein the controller is to selectively adjust the pump rate during pump down operations based on wireline speed data received from the speed sensor.

4. The system of claim 1 further comprising a tension sensor in communication with the controller, wherein the controller is to selectively adjust the wireline speed and the pump rate during pump down operations based on wireline tension data received from the tension sensor.

5. The system of claim 1 further comprising a pump rate sensor in communication with the controller, wherein the controller is to selectively adjust the wireline speed during pump down operations based on pump rate data received from the pump rate sensor.

6. The system of claim 1 wherein the controller comprises a wireline controller that is part of the wireline unit and a pump controller that is part of the pump unit.

7. The system of claim 6 wherein, if the wireline controller notifies the pump controller that a monitored wireline speed is less than a predetermined threshold, the pump controller increases a pump rate of the pump unit in response to said notification.

8. The system of claim 6 wherein, if the wireline controller notifies the pump controller that a monitored wireline tension is more than a predetermined threshold, the pump controller decreases a pump rate of the pump unit in response to said notification.

9. The system of claim 6 wherein, if the pump controller notifies the wireline controller that a monitored pump rate is less than a predetermined threshold, the wireline controller decreases a wireline speed in response to said notification.

10. A system to advance a tool into a wellbore, comprising:
   a wireline unit couplable to the tool;
   a pump unit to pump fluid into the wellbore;
   a processor coupled to the wireline unit and the pump unit via a communication interface; and
   a computer-readable storage medium coupled to the processor, the computer-readable storage medium storing a pump down control application that, when executed, automates at least one of: a pump rate for the pump unit based on at least one of a monitored wireline speed and a monitored wireline tension for the wireline unit; and a wireline speed for the wireline unit based on at least a monitored pump rate for the pump unit.

11. The system of claim 10 wherein the pump down control application causes the processor to generate pump control commands to adjust the pump rate in response to a change in a monitored wireline speed.

12. The system of claim 10 wherein the pump down control application causes the processor to generate pump control commands to adjust the pump rate in response to a change in the monitored wireline tension.

13. The system of claim 10 wherein the pump down control application causes the processor to generate wireline control commands to adjust a wireline speed in response to a change in a monitored pump rate.

14. The system of claim 10 wherein the pump down control application causes the processor to analyze sensor data during pump down operations to determine a wireline speed value and wireline tension value.

15. The system of claim 14 further comprising a communication interface, wherein the pump down control application causes the processor to send the wireline speed value and the wireline tension value to an external pump control unit that controls the pump rate using the wireline speed value and the wireline tension value.

16. A computer-readable medium storing instructions that, when executed, cause a processor to:
set a pump rate for a pump unit configured to pump fluid into a wellbore;
set a wireline speed for a wireline unit for pump down operations based on user input;
set a wireline tension threshold for a wireline of the wireline unit for pump down operations based on user input; and
generate commands to automatically control at least one of: a pump rate for the pump unit for pump down operations based on the set wireline speed and the set wireline tension; and a wireline speed for the wireline unit based on the set pump rate for the pump unit.

17. The computer-readable medium of claim 16 wherein the instructions, when executed, cause the processor to generate commands to automatically control the pump rate to maximize wireline speed up to the set wireline speed as long as wireline tension does not surpass the set wireline tension threshold.

18. The computer-readable medium of claim 16 wherein the instructions, when executed, cause the processor to generate at least one command in response to a monitored wireline tension surpassing the set wireline tension threshold, the at least one command causing at least one of: an increase in wireline speed; and a decrease in pump rate for pump down operations.

19. The computer-readable medium of claim 16 wherein the instructions, when executed, cause the processor to display a user interface that enables a user to adjust settings for the wireline speed and wireline tension threshold.

20. A method for pumping a tool coupled to a wireline of a wireline unit into a wellbore, comprising:
monitoring, by a controller, a wireline speed for the wireline unit;
monitoring, by the controller, a wireline tension of the wireline;
monitoring, by the controller, a pump rate for pumping the tool into the wellbore with a pump unit configured to pump fluid into the wellbore; and
automatically controlling, by the controller, at least one of a wireline speed for the tool being pumped into the wellbore based on at least the monitored pump rate for the pump unit; and the pump rate for pumping the tool into the wellbore with the pump unit based on at least one of the monitored wireline speed and monitored wireline tension.

21. The method of claim 20 further comprising receiving sensor data and determining the wireline speed and the wireline tension from the sensor data.

22. The method of claim 20 further comprising increasing the pump rate in response to a reduction in the monitored wireline speed.

23. The method of claim 20 further comprising changing the pump rate in accordance with a difference between the monitored wireline speed and a predetermined threshold.

24. The method of claim 20 further comprising changing the wireline speed in response to a monitored pump rate.

25. The method of claim 20, further comprising:
driving the tool into a casing, the tool including a perforating gun and a plug releasably coupled to a lower end of the tool, wherein the plug is a pump down plug and the tool is driven down the casing by pumping the pump down plug down the casing;
plugging the casing with the plug to seal off a portion of the casing downstream of the plug from a portion of the casing upstream of the plug; and
firing the perforating gun.

26. The method of claim 25, further comprising recovering the tool with the wireline unit.

27. The method of claim 25, wherein firing the perforating gun includes setting the gun to fire after a predetermined period of time.

28. The method of claim 25, wherein firing the perforating gun releases the releasable coupling between the plug and the lower end of the tool.

* * * * *